(12) United States Patent
Davies et al.

(10) Patent No.: US 10,855,077 B2
(45) Date of Patent: Dec. 1, 2020

(54) SYSTEM AND METHOD FOR UTILITY MANAGEMENT

(71) Applicant: Green Running Limited, Somerset (GB)

(72) Inventors: Peter Gareth Davies, London (GB); Conrad Spiteri, London (GB)

(73) Assignee: Green Running Limited, Bath (GB)

(*) Notice: Subject to any disclaimer, the term of this patent is extended or adjusted under 35 U.S.C. 154(b) by 25 days.

(21) Appl. No.: 16/026,668

(22) Filed: Jul. 3, 2018

(65) Prior Publication Data

US 2019/0013669 A1 Jan. 10, 2019

(30) Foreign Application Priority Data

Jul. 4, 2017 (GB) .................................. 1710719.4

(51) Int. Cl.
| | |
|---|---|
| *H02J 3/14* | (2006.01) |
| *G06Q 50/06* | (2012.01) |
| *G06Q 10/06* | (2012.01) |
| *G01D 4/00* | (2006.01) |
| *H04L 9/06* | (2006.01) |
| *H04L 29/08* | (2006.01) |

(52) U.S. Cl.
CPC ............... *H02J 3/14* (2013.01); *G01D 4/004* (2013.01); *G06Q 10/06315* (2013.01); *G06Q 50/06* (2013.01); *H04L 9/0637* (2013.01); *H04L 67/1042* (2013.01); *Y02B 70/3266* (2013.01); *Y04S 50/12* (2013.01)

(58) Field of Classification Search
None
See application file for complete search history.

(56) References Cited

U.S. PATENT DOCUMENTS

| | | | |
|---|---|---|---|
| 4,858,141 A | 8/1989 | Hart et al. | |
| 10,339,602 B2 * | 7/2019 | Tokunaga | ............... H02J 3/383 |
| 2004/0225649 A1 * | 11/2004 | Yeo | .......... G01D 4/004 |
| 2007/0050493 A1 * | 3/2007 | Sienel | ................... H04L 67/104 |
| | | | 709/223 |

(Continued)

FOREIGN PATENT DOCUMENTS

| | | |
|---|---|---|
| EP | 2 280 734 A1 | 2/2016 |
| EP | 3 016 229 A1 | 5/2016 |

(Continued)

*Primary Examiner* — Robert A Cassity
(74) *Attorney, Agent, or Firm* — Blank Rome LLP

(57) ABSTRACT

A utility management device, comprising an input for receiving a utility consumption signal for a premises, an output for outputting utility management information, and a processor configured to monitor the input utility consumption signal for a change in magnitude. If a change is detected, the processor is configured to identify an appliance event corresponding to the change, obtain information relating to the projected utility consumption of the appliance for an upcoming time period, update a projected utility consumption of the premises based on the obtained information, determine whether any projected stored and/or generated utility amount at the premises is sufficient for the projected utility consumption of the premises, and, if not sufficient, cause the device to output a request to receive a utility amount from one or more other premises connected to the premises via a communication network.

17 Claims, 11 Drawing Sheets

(56) References Cited

U.S. PATENT DOCUMENTS

| | | | | |
|---|---|---|---|---|
| 2008/0046387 A1* | 2/2008 | Gopal | ................ | G01D 4/004 |
| | | | | 705/412 |
| 2011/0225016 A1 | 9/2011 | Boss et al. | | |
| 2013/0110621 A1 | 5/2013 | Gupta et al. | | |
| 2014/0278104 A1* | 9/2014 | Proietty | ............ | G01C 21/3438 |
| | | | | 701/537 |
| 2017/0103468 A1* | 4/2017 | Orsini | ................ | G06Q 40/12 |

FOREIGN PATENT DOCUMENTS

| | | |
|---|---|---|
| EP | 3 032 691 A1 | 6/2016 |
| GB | 2475172 A | 5/2011 |
| WO | WO 2015/099857 A1 | 7/2015 |

\* cited by examiner

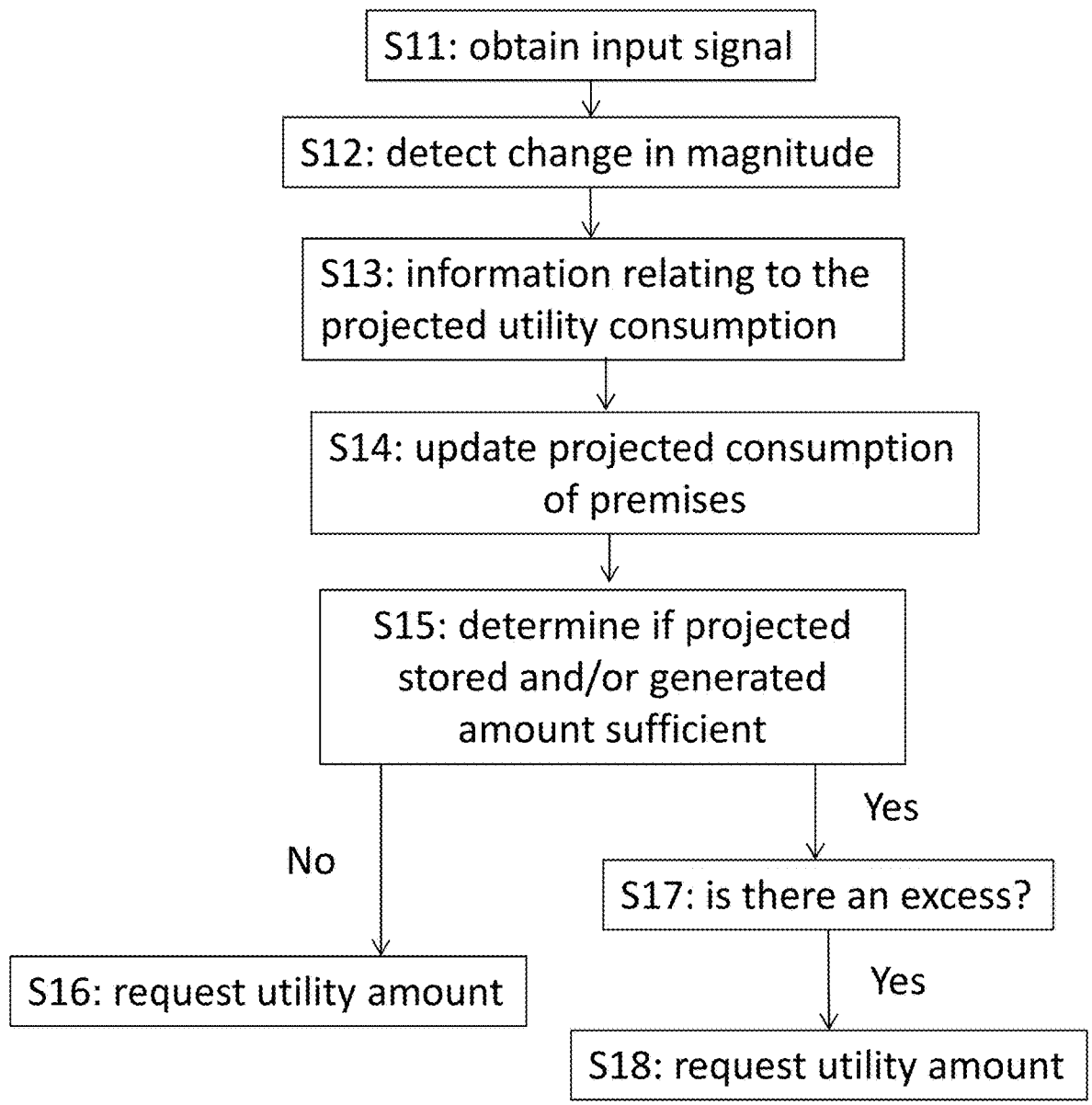

Fig. 6

SYSTEM AND METHOD FOR UTILITY MANAGEMENT

CROSS-REFERENCE TO RELATED APPLICATIONS

This application is based upon and claims the benefit of priority from prior United Kingdom Application number 1710719.4 filed on Jul. 4, 2017 the entire contents of which are incorporated herein by reference.

FIELD OF THE INVENTION

The present invention relates to a system and method for utility management.

BACKGROUND OF THE INVENTION

Numerous utility monitoring devices are available. It is desirable to manage the utility consumption of appliances, utility generation and/or utility storage at premises.

BRIEF DESCRIPTION OF THE DRAWINGS

For a more complete understanding, reference is made to the following description and accompanying drawings, in which:

FIG. 1(b) shows a flowchart of a method of utility management according to an embodiment;

FIG. 6 shows an example of an energy prediction table construction, condensed to 5 minute column average from a second by second prediction table for better visibility;

DETAILED DESCRIPTION

Figure 1A:
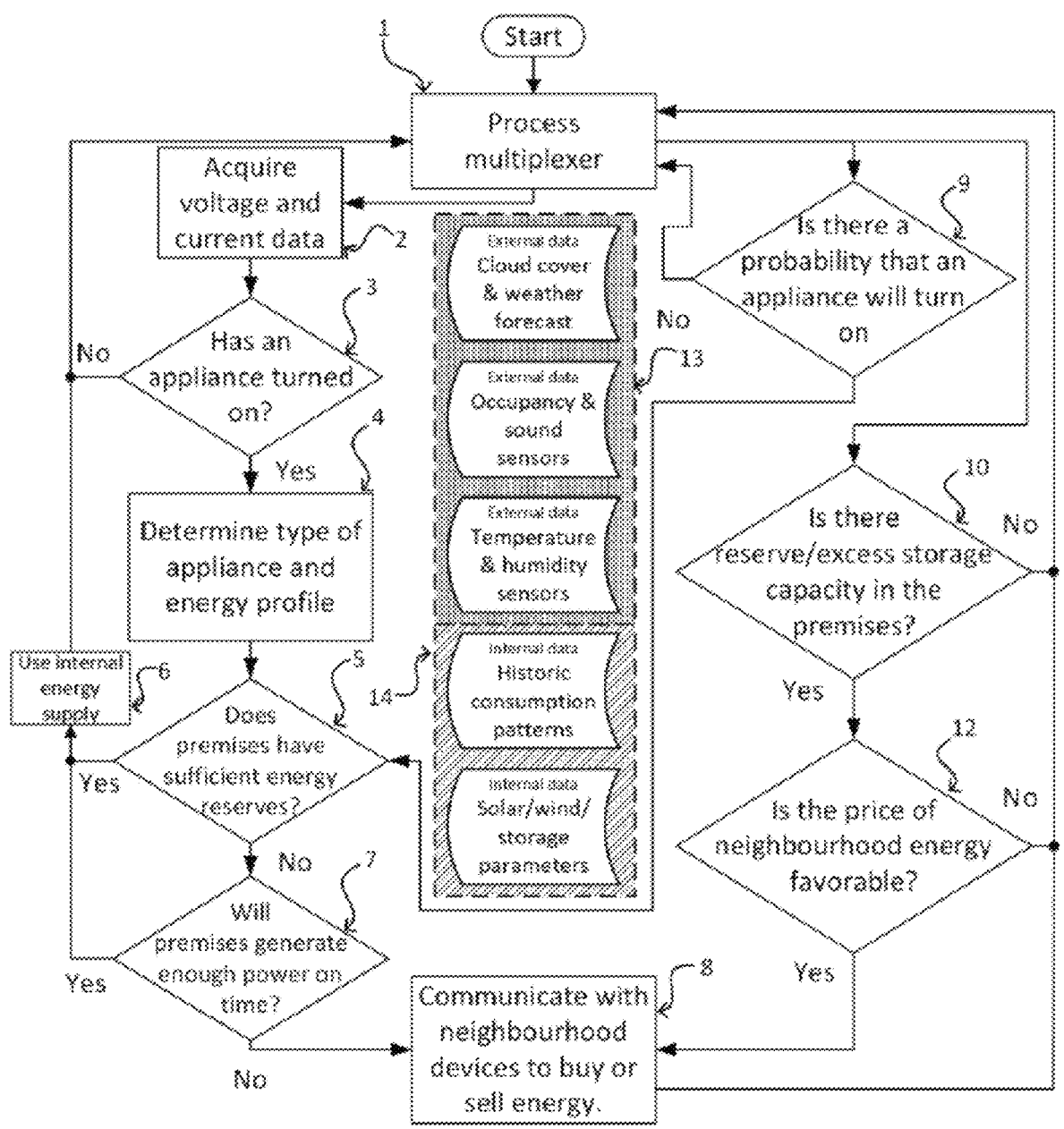
FIG. 1(a) shows a flowchart of an algorithm according to an embodiment, that detects and classifies appliances then trades energy based on the appliance requirements.

In an embodiment, there is a method for securely trading electricity from domestic and/or commercial micro-generation and/or storage systems within a premises based on a blockchain platform, with the ability to foresee and pre-trade the energy requirements or surplus of the premises. It is desirable for, various reasons, to trade energy generated through micro-generation methods with the immediate neighbourhood of a premises.

In an embodiment, the method is able to pre-empt the energy requirements of a premises or pro-actively trade foreseeable surplus energy using a blockchain framework or any other secure peer-to-peer communications.

In an embodiment, the method enables a premises to pre-empt the energy requirements of the premises and/or pro-actively trade stored and/or foreseeable surplus energy using a blockchain framework or any other secure peer-to-peer communications.

In particular the method may monitor the electrical network of a premises including its electricity consumption through the grid, electricity generation through solar panels, wind turbines or any other commercially available renewable energy generation method and its electricity storage medium by means of batteries or any other commercially available energy storage method. In addition, the method is able to disaggregate appliance signatures from the combined data of the premises electrical network to identify a plurality of appliances consuming power from the said electricity network, for example using a method such as described in GB2475172A published on May 11, 2011 and incorporated herein by reference, and use the dis-aggregated data to identify and label the appliances and store their power demand information over time.

The monitoring of the electrical network may be through a single device aggregating all the power information from one point, a plurality of devices within the premises (where a single device or cloud based system would act as the single aggregation point) or a combination or hybrid of these methods. Appliances may be, by way of example only, domestic or commercial appliances known as white goods, small domestic appliances such as, by way of example only, kettle, toaster, blender, etc., and/or any other device that can operate in a domestic or commercial environment that consumes electricity whether connected to a single phase mains input, poly/multi-phase mains input or three phase mains input within a domestic or commercial premises including Heating Ventilation and Air Conditioning (HVAC) systems. The term "premises" refers to any building or structure which can house appliances whether domestic, commercial or otherwise and has a means to acquire or generate electricity.

In an embodiment, the method is also able to release energy from the storage and/or energy generation methods within the premises to the grid and communicate with other such devices on the grid and/or within the neighborhood (the term "neighborhood" and "neighbors" are used interchangeably through this document, have the same meaning, and refer to and can be, the immediate next door neighbour to a premises, surrounding premises within the vicinity of the premises, the entire street, the postcode area, the postcode and/or geographically identified areas as required by the system or imposed to the system) to sell energy or demand energy from the neighborhood in case of shortage or based on historic usage information.

Since the energy demand of an appliance is well understood and the method is able to detect when an appliance has switched on, the method is able to trade and/or pre-trade any energy demand or surplus before it is actually needed. This may ensure the best possible transaction rate for both supplier and consumer of the energy. The trading negotiation, contract, and proof of supply and consumption are all handled by an underlying blockchain framework or any other secure peer-to-peer communications for example.

In an embodiment, the method is also able to extract electricity usage patterns of the premises and combine this information with data from other sources to pre-empt the power demands of the premises and sell or acquire power accordingly.

The pre-empting or prediction of energy usage is based on the actual power usage, any specific appliances that have recently switched on where their power consumption pattern is known and stored in a historical database on the device or on a cloud server, and on historic electricity usage patterns of the premises for example.

The trading mechanism may be analogous to the high frequency currency trading known as "forex", where speed of trading and market foresight ensure the best trade deal. Since the algorithm is able to determine the type of appliance that has switched on within the first few seconds of the appliance turning on and is aware of the power consumption profile over the duration of the appliance's usage cycle, it is possible to trade and/or pre-trade energy at sub second rates. This depends on the type of appliance and the speed of detecting that the appliance has turned on.

Similarly, the method may take advantage of supply and demand mechanisms where energy is bought during times of low demand when the price is low and store it for future use within the premises or sell it during times of high demand when the price is significantly more than the price it was bought at.

More specifically, the method analyses and stores the current and voltage being consumed by a plurality of appliances within a premises. Referring to FIG. 1, a process multiplexer 1 cycles through the various parts of the algorithm where in one cycle a device or devices acquire data 2 from the current and voltage sensors using Non-Intrusive Load Monitoring (NILM) or any other current and voltage acquisition methods which are connected to the premises mains input, the micro-energy-generation system and the energy storage system at periodic intervals of up to 100 MHz i.e. the sampling frequency for example. The power drawn from each of the three sources is measured (grid, generation system, and storage). The power being generated by the energy generation system (e.g. solar and/or wind) and the power going to/coming from the storage (e.g. battery) is also measured.

The data acquisition can be, by way of example only, from a number of different data collection units communicating together over a local data connection or communicating to a plurality of cloud servers or, by way of another example only, a single data collection unit hosting multiple voltage and current sensors sampling at the same said frequency and processing the data locally or communicating to a plurality of cloud servers. The sampling frequency may be dependent on the capabilities of the processor within the data collection units.

The data is analysed 3 to determine if an appliance has switched on. The analysis is a determination of whether a change has occurred in the power consumption of the appliance, its harmonics or transients. This change is hereafter referred to as an "event". A simple step detection may be used to find abrupt changes in the utility signal, which are extracted as events. For example, a section of the signal is extracted, the section comprising the identified event, for example 500 milliseconds either side of the event, are extracted. In some cases, the abrupt change in power is a simple and effective indication of an event, however in other cases the change is more complex, such as, by way of example only, contain ramps, switchbacks, flat areas within the transition or an abrupt change in the phase angle between the current and the voltage, that is, an abrupt change in the real power consumption.

These complex events may further be (i) be caused by single individual devices such as microwaves, dryers and washing machines whose state transitions are often complicated or (ii) be caused by more than one device happening to change state within the duration that the event was recorded. In addition, there may be instances where an appliance or component within an appliance switches off at the same time as another appliance or components within a different or the same appliance, switch on and which draw the same power. In such case the algorithm would not be able to detect an event based on an abrupt change in power consumption, however the harmonics of the power draw from one appliance to the other or one or a plurality of components to others, would change. Therefore a change in harmonics can also constitute an event.

A transient is a type of event, which comprises an initial power increase followed by a return to a lower steady state. Such changes may be seen in the voltage, for example features such as one or more of the harmonic amplitude values for the voltage. They are also visible in the power features. A transient is a non-repetitive spike in the signal which may occur, for example, when a high powered component is turning on, but are not seen throughout the operation of that component.

Figure 2:
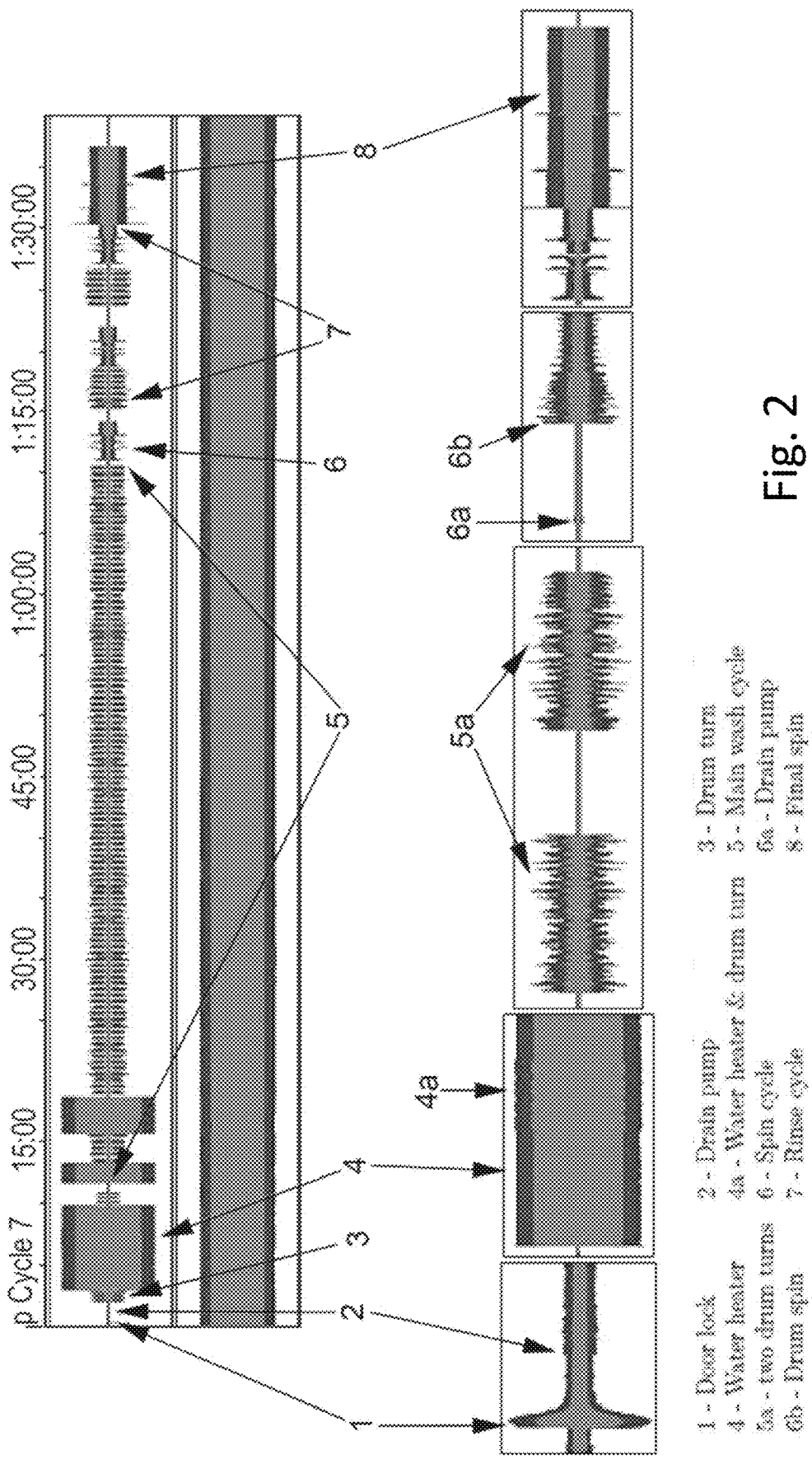
FIG. 2 shows a breakdown of the components operating within an example washing machine.

Each event is presented to a classifier for identification 4. For example when the washing machine door is locked (See FIG. 2, stage 1), the leading edge of the power consumption and harmonics are vectorised and presented to the classifier. This is subsequently identified as the "door lock start". Every subsequent event belonging to the washing machine is then used to refine the power usage prediction model, i.e. the long-term electricity usage patterns.

In an effort to remove unwanted background noise pre-event power levels and optionally harmonics may be subtracted from the post event data. A portion of the extracted event section prior to the identified event is extracted. This is the pre-event portion. A portion of the extracted event section after the identified event is extracted. This is the post event portion. To achieve the subtraction, the pre-event current and voltage signal are converted into the frequency domain using a Fast Fourier Transform (FFT) algorithm and the post event current and voltage signal are converted into the frequency domain using the same FFT. The resultant peaks of the pre-event are subtracted from the post event peaks. For example the pre-event portion of the current and voltage and the post-event portion of the current and voltage are fed into an FTT algorithm, where the fundamental frequency is 50 Hz, The number of harmonics may be selected, where the maximum number of harmonics depends on the sampling frequency. The entire extracted event section may be transformed into the frequency domain by means of a FFT algorithm.

The algorithm makes use of a Machine Learning algorithm, explained further below, to identify the appliance 4 in line with NILM classification and other methods and infer its immediate future consumption pattern from historical data stored on the device hosting the algorithm, a local storage device located on the local network or on a cloud server. The immediate future consumption pattern may be a stored power consumption profile. The algorithm is also aware of the amount of energy present within the energy storage and the amount of energy available from the micro-generation system. The energy from the micro generation may be measured and the energy present within the energy storage system may be polled from the storage system (e.g. battery) via an API for example. These parameters and the historical data are referred to as "Internal data" 14.

In addition the algorithm may make use of additional data such as cloud cover and weather forecasts (by way of example only, such as data available from http://meteora-dar.co.uk/sun-forecast), occupancy and sound sensors, and temperature and humidity sensors. These parameters are referred to as "External data" 13.

Once the appliance has been identified and its energy usage profile determined, the algorithm compares this information to the amount of energy stored in the system 5. External and internal data is also taken into consideration. By way of example only, if it is determined that the system does not have enough energy to complete the washing machine cycle, the cloud cover forecast may be invoked to determine whether there will be enough sunshine, by the time the energy is required, to sufficiently charge the batteries to the required level and therefore be able to complete the cycle.

The system may be a continuous monitoring system. For example, calculations may be performed every hour and generate a 24 hour prediction every time with a varying degree of accuracy (around 80% within the next 2 hours, 70% accuracy between 2 and 6 hours, and 60% accuracy for the rest, for example).

Other devices that are in use or might come into use based on the historical data patters are taken into account.

Thus an appliance is detected (in stage 3) and the type and energy profile determined (in stage 4). The system then checks if there is sufficient energy to service this appliance (in stages 5 and 6). This is done by adding the power values from time bins in the stored profile to the projected and current consumption (assuming the appliance was switched on unexpectedly and not forecasted i.e. the values are already in the forecast bins). If the values within each "demand" bin are less than the values in the "supply" bin and the consumption will not affect future commitments (e.g. sale of energy to others) then the internal energy supply is used. Alternatively, energy is sourced externally.

In addition, the time of day, and therefore the elevation and azimuth of the sun might be taken into consideration to determine the amount of energy that the solar panels will produce. Furthermore, the ambient and internal temperature might be used to increase the precision of this prediction. Similarly, wind forecasts may be used to determine the amount of energy a wind turbine would produce for the same scope. Therefore the algorithm determines whether the local energy generation method will be able to restore the required energy levels in time for when it is needed (stage 7). Similarly this prediction may also be available for the day, week, and month ahead with varying degrees of precision. These predictions may be constantly updated based on any new information from the internal and external data sources and any updates to the usage patterns of the premises.

Should the algorithm determine that there is sufficient energy stored and/or generated within the premises, then the internal energy supply is used 6. Should the algorithm determine that there is a shortage of energy stored and/or generated within the premises, then a communication with the neighbourhood is initiated to buy the required energy 8. This energy trading method is further discussed below.

Through the multiplexed process 1, the algorithm determines whether an appliance may be about to turn on based on historical usage patterns of the premises 9. In addition, other parameters may be taken into consideration such as occupancy, sound and/or other sensors, cloud and weather forecasts, temperature and humidity sensors, etc. This external data helps to determine the probability of whether an appliance will switch on in the immediate or near future. If it is determined that an appliance is about to switch on then the process of determining whether the premises has enough energy to fulfil the requirements of the device 5 is engaged followed by the same procedure explained above. Whereas stage 4 identifies that an appliance has turned on and stage 5 assesses whether the premises has enough stored/generated energy to complete the current cycle of that appliance, stage 9 predicts whether an appliance is about to turn on. If stage 9 determines that an appliance is about to turn on, then it informs stage 5 to evaluate whether there is enough energy to support this appliance.

Through the multiplexed process 1, the algorithm determines whether the premises has any reserve storage capacity 10. Should the premises have spare storage capacity and the current trading price of power be under a pre-determined threshold 12, the algorithm can purchase energy 8 and store it for later use within the premises or for later trading when the selling price of energy is higher than the price it was bought at for example.

Similarly, if the algorithm determines that the system has excess energy stored 10, it can make this energy available to the neighbourhood if it determines the price is favourable to trade or based on restrictions and agreements within the neighbourhood. The energy would be traded via communication with neighbouring systems 8.

FIG. 1(*b*) shows a utility management method according to an embodiment.

In step S11 a utility consumption signal for a premises is obtained.

The signal may comprise an input current signal i(t) and/or an input voltage signal v(t) supplied by the mains electricity for example. The voltage and/or current signals may comprise data generated by sampling the current and/or voltage supplied from the mains using one or more sensors, for example a current sensor and/or voltage sensor. In an embodiment, sampling is performed at a sampling frequency of greater than or equal to 1 kHz. Sampling at 1 kHz results in 20 samples per mains cycle, where the mains frequency is 50 Hz. The utility consumption signal may comprise a single phase signal comprising a single current and voltage signal, a split phase (or dual phase) signal comprising two current signals and two voltage signals, or a three phase signal comprising three current signals and three voltage signals for example.

The signal may comprise the combination of the utility consumption from a utility grid (for example mains electricity), from utility storage at the premises and from utility generation at the premises. In this case it corresponds to the aggregated utility consumption and generation at the premises, corresponding to utility consumption of one or more appliances and utility generation.

An additional input (for example current and/or voltage sensor) for monitoring utility generation at the premises (for example one or more of a solar PV installation, wind turbine, . . . ,) and/or an additional input (for example current and/or voltage sensor) for monitoring utility storage at the premises (for example a home battery storage unit) may be included for example. For example, a current clamp connected to each utility generation device and each utility storage device may be included, allowing the current at these devices to be measured. The device supply may measure the voltage for both devices. The voltage and current generated by the inverter of the generation system and the storage system may be measured, a real power calculated and then combined with the grid measurement of real power. These may be combined to form an aggregate input signal. A measurement of the power generated at the generation system and the power at the storage system is thus made.

A measurement of voltage and current at the storage system may be made in which the direction is a function of the phase angle. For example, if the current lags the voltage by around 180 degrees, then the battery is charging. If the current is roughly in phase with the voltage then the battery is discharging. This can be converted to a negative value for discharging (i.e. the aggregate signal will comprise the grid power added to the generated power, with the power discharged from the storage subtracted). The stored level may be obtained from the energy storage unit via an API for example.

Further processing of the input current and/or voltage signals may be performed to generate one or more signals from the input current and/or voltage signals. For example, a total power consumption metric may be obtained, for example real power, apparent power and/or RMS current. This may be obtained for windows corresponding to a plurality of samples in the input signal for example.

One or more further steps may be applied to signal at this stage, for example filtering to remove high frequency noise, or any output (feed-in) to the grid i.e. any electricity supplied to the grid network outside the premises. When the utility storage reaches capacity, any additional utility generated is sent to the grid, referred to as feed-in. This may be subtracted from the total amount of utility being consumed by the premises (however this energy is still available for use within the premises if required).

The appliances may include any household or commercial electrical appliance, including but not limited to heat pumps, HVAC (heating, ventilation, and air conditioning), electric vehicles and white goods (fridge, freezer, washing machines, dryers, dishwashers).

In S42, the aggregate signal is monitored for a change in magnitude. A step detection algorithm may be performed, for example, using a total power consumption metric (e.g. power or RMS current). Once a step is detected, referred to as an event, a portion of the signal corresponding to the event may then be extracted for further processing. The events may be extracted in portions of fixed or varying duration. For example, a pre-event portion of fixed duration and a post-event portion of fixed duration may be extracted corresponding to the event each time a change in magnitude is detected. The portion may be extracted for one or more of: an input current signal, an input voltage signal, a power signal (e.g. real power or apparent power), and an RMS current signal.

When a change in magnitude has been detected in e.g. the power signal, a further step of detecting for a change in the frequency data may also be performed.

Once a change in magnitude has been detected, data corresponding to the event portion may then be generated in this step. The data may comprise current and/or voltage signals corresponding to the event portion (with or without background removed), RMS current or power signals corresponding to the event portion (with or without background removed), aggregate values (such as total real power change for example), and/or frequency data (such as harmonic magnitude values).

In an embodiment, a change in magnitude is detected if a change greater than a threshold value is detected. In an embodiment, the threshold is 10 Watts.

Further criteria may be applied during step detection, for example, changes in real power level that exceed a threshold and are preceded and followed by quiet periods of low variance may be detected as events. These detected steps may then be extracted in windows of varying duration, dependant on the time taken for the signal to settle into a low variance regime.

In an embodiment, a change is detected by calculating the difference between adjacent power samples in the real power time series signal, referred to as the deltapower. When the deltapower value exceeds a threshold value, an event is detected. Alternatively, an event may be detected only if the sum of the deltapower values within a specified time window exceeds a threshold value for example.

In an embodiment, where the utility consumption signal comprises a split or three phase electrical signal, monitoring for a change in the magnitude of the input signal may comprise monitoring each phase, where a change detected in any phase is detected as an event. This may comprise generating one or more of the corresponding real, apparent or RMS current signals from each pair of current and voltage signals, and monitoring each. A change detected in any of the signals is registered as a change.

Once an event has been detected, data corresponding to the event may then be generated and then used for event identification. The data may comprise a vector of extracted features, or several time series of extracted data for example.

A background removal step may be performed at this stage. For example, when the event is an "on-set" (i.e. a device switching on, where the change in magnitude is positive) the pre-event portion may be subtracted from the post-event portion before features are extracted. When the event is an "off-set" (i.e. a device switching off, leading to a negative change in magnitude) then the post-event portion may be subtracted from the pre-event portion.

A mean current cycle value may be generated, for example by calculating the mean current value for each discrete time location in the current cycles in the pre-event portion for an on-set event (or the post-event portion for an off-set event), resulting in a mean current vector which is representative of the background. Removing the background then involves subtracting this mean current vector from the current vector of each cycle of the post-event signal portion (or the pre-event signal portion for an off-set event). The process may be performed for a power signal corresponding to the event signal portion for example (e.g. real power signal, apparent power signal).

Frequency data corresponding to the event may also be extracted in this step, for example amplitude values for one or more harmonic frequency components. Background removal may also be performed on the frequency data. For example, the pre-event current and voltage signals may be converted into the frequency domain using a Fast Fourier Transform (FFT) algorithm, and the post-event current and voltage signal converted into the frequency domain using the same FFT. The resultant peaks of the pre-event are then subtracted from the post event peaks (for an on-set event) to give resulting frequency data corresponding to one or more harmonic magnitude values. The post-event peaks are subtracted from the pre-event peaks for an off-set event. The amplitude value corresponding to a plurality of harmonic frequencies, wherein the harmonic frequencies are the positive integer multiples of the fundamental frequency of the appliance operation signal, may be extracted for example. The fundamental frequency for the case of an electrical signal corresponds to the mains frequency, which is 50 Hz in the UK and 60 Hz in the US for example. Extraction of the frequency data is performed on the aggregate signal. The generated electricity may have the same fundamental frequency as the mains electricity and may be synchronized to the grid using self-synchronous inverters.

A real power value may be calculated for each of a plurality of cycles:

$$P_i = \frac{1}{n_{cyc}} \sum_{k=1}^{n_{cyc}} v_k(t) i_k(t), t \in T_i$$

where $n_{cyc}$ is the number of samples per mains cycle and $T_i$ is the duration of the i-th mains cycle. For a 10 kHz sample rate in a country with 50 Hz main power, $n_{cyc}$=200. $V_k(t)$ is a time series of the voltage values for the cycle k and $i_k(t)$ is a time series of the current values for the cycle k, either with or without the background removed.

The apparent power value for each cycle may be calculated from:

$$|S|_i = \frac{1}{n_{cyc}} \sqrt{\sum_{k=1}^{n_{cyc}} v_k(t)^2} \sqrt{\sum_{k=1}^{n_{cyc}} i_k(t)^2}, t \in T_i$$

In this step, a change of magnitude in the input data is detected as an event. Data relating to the event portion, for example relating to signal data from before and after the event, is then generated. The data may be inputted into an algorithm for example. The algorithm may comprise a classifier configured to output a probability corresponding to each of a plurality of events. The event may then be identified as that with the highest probability for example. Alternatively, some further processing may be performed to identify the event, for example taking into account data from previous events. Events relating to multiple components in an appliance may be identified for example, such as 'door lock start' for a washing machine. Events relating to different appliances and different components within appliances may be identified.

Thus a classifier input is generated corresponding to the event. The input is inputted into the classifier. The classifier may be a machine learning based classifier that is trained prior to implementation. The training stage will be discussed later.

The classifier may generate an event probability value for each of one or more appliance or appliance component state changes. The event probability value is the probability that the event portion of the signal corresponds to the change in state of the appliance or component.

The classifier input is obtained from the signal data, for example the data time series themselves may be directly input to the second classifier (for example the current, voltage, RMS current and/or power time series, with or without background removed) or further processing may be applied to the time series before inputting to the second classifier (for example buffering/stretching, normalising, etc). Alternatively, a one-dimensional first feature vector of values may be generated, comprising for example a power change value, frequency data such as harmonic magnitude values, etc. This first feature vector may then be input into the second classifier.

For a split phase (or dual phase) signal comprising two current signals and two voltage signals, features may be generated corresponding to each phase. Similarly, for a three phase signal comprising three current signals and three voltage signals, again features may be generated corresponding to each phase.

The classifier may be a neural network based classifier for example. For example, where a first feature vector is generated corresponding to the event (comprising for example a real power change value and one or more harmonic magnitude change values), this first feature vector is then input into the classifier comprising an artificial neural network (ANN). Each node in the input layer of the ANN computes a weighted sum of all of its inputs (being each of the features in the feature vector) and an additive bias term, and then applies an activation function to the result. The outputs of each layer are then fed as the inputs to the subsequent layer. Each node again computes a weighted sum of all of its inputs (being the outputs of each node in the previous layer) and an additive bias term, and then applies an activation function to the result. Each node in the final layer outputs a value into the vector of probabilities, where each probability in the output vector corresponds to the probability that the event corresponds to a particular appliance or appliance component state change. The weights and biases are the trainable parameters, the values of which are learned during the training stage (described later).

A convolutional neural network (CNN) may be used where two or more 1-dimensional time series are taken as input. CNNs are a class of neural network that include one or more convolutional layers. A convolutional layer comprises a set of linear filters, each characterised by a weights vector, and an additive bias term per filter. During operation each filter is convolved across the input data time series.

An LSTM based classifier may also be used.

The list of appliance and/or component state changes, which correspond to classes and sub-classes in the classifier, and the corresponding event probability values outputted from the second classifier may be converted to an event identification, for example by selecting the state change corresponding to the highest probability or by performing some further processing.

In this step, any suitable method of identifying the appliance or component state change corresponding to the signal event may be performed.

In S11 and S12, utility consumption of the premises is monitored, events detected and the corresponding appliance identified. However, in an alternative embodiment, the system may instead simply receive a signal comprising information relating to appliance events for a premises. In such a case, a signal comprising information relating to an appliance event is received, and steps S13 onwards are then performed.

In S13, information relating to the projected utility consumption of the appliance corresponding to the identified event for an upcoming time period is obtained. For example, stored information relating to the power consumption profile over an appliance usage cycle may be obtained. Alternatively, stored information relating to the power consumption profile over a time period may be obtained.

The stored data may be historic data from the same house. For example, when a new appliance is detected, a profile of that appliance is built. The profile may comprise real power data over the duration of one appliance cycle. The appliance cycle may be from a start event to a stop event, or a fixed period of time for example. As more samples of the same appliance cycle are recorded, an average cycle and a cycle deviation measure may be established.

As different appliance cycles (for example different programs) from the same appliance are sampled, a breadth of profiles may be established. When the appliance is switched on again, the type of profile is detected then the expected deviation of that profile used in the algorithm to determine whether it is the correct profile. The type of profile may be selected as the most common profile initially. The average profile corresponding to the most common profile is then used to predict the power consumption over the upcoming time period. The deviation from the actual power consumption values may be compared to the stored deviation associated with the profile to determine if the correct profile has been used. For example, the stored deviation value may be of the order of a few seconds. A departure from this is either a fault or, if higher than a threshold (for example 120 seconds), it may be indicate the wrong program.

The detected event may be identified as a washing machine "door lock" event in S12. A washing machine door lock event in an example washing machine cycle is indicated by the label 1 in FIG. 2. Stored information relating to the power consumption profile corresponding to the washing machine cycle is then used. The example washing machine cycle shown in FIG. 2 comprises events 1 to 8 (1 being the door lock event and 8 being the final spin). The stored information may comprise real power values over time.

For example, a database comprising entries corresponding to time bins corresponding to upcoming periods of time may be used to implement the method and manage the power. For example, each time bin may correspond to 1 second. Each bin may alternatively correspond to 1 minute, 15 minutes, 30 minutes, 1 hour, etc for example. The stored power profile corresponding to the identified appliance may comprise a power consumption value (for example a real power value in watts) corresponding to each of a number of time bins corresponding to time periods within the washing machine cycle (from the start of event 1 to the end of event 8 in this case).

When a washing machine event is identified in S12 (for example event 1), the time bins in the stored power profile for the washing machine are matched to the time bins in the database used to manage the power. For example, the time bin corresponding to the start of event 1 in the stored power profile is matched to the current time bin in the database used to manage to power (at which the event corresponding to event 1 was identified in S12). The bins comprise the predicted load at a specific (device wide) granularity, for example 1 second. Adding a new appliance comprises an addition of a new row of the appliance profile bins to the rows of house profile bins, starting from the current bin.

A row in the database used to manage power corresponding to the washing machine is thus generated (or an existing washing machine row is used is present). The real power values for the time bins in the stored washing machine profile are then inputted to the corresponding time bins in the washing machine row in the database used to manage power, starting from the current time bin (corresponding to the time bin at the start of event 1 in the stored profile).

Thus in an embodiment, a table may be generated and populated with the utility consumption information for upcoming periods of time.

In the above described example, the identified event corresponded to event 1 in the stored profile (i.e. the start of the cycle). However, if the identified event corresponds to another event in the stored profile, the data from the stored profile corresponding to the identified event onwards may be used. Although in the described example, the stored profile corresponds to a complete cycle, in other cases a stored profile corresponding to part of a cycle or to a fixed time period may be used. For example, for an appliance such as a fridge, which does not have a cycle, a profile corresponding to a 24 hour time period after a compressor switch on event may be stored.

The database may comprise a row corresponding to each of a plurality of appliances. For example, it may be known initially which appliances are present at the premises. Alternatively, a user may enter data indicating the appliances present. Alternatively, as each event is identified, a new row is added to the database corresponding to the appliance that generated the event, if the appliance does not have an existing row.

Figure 6:
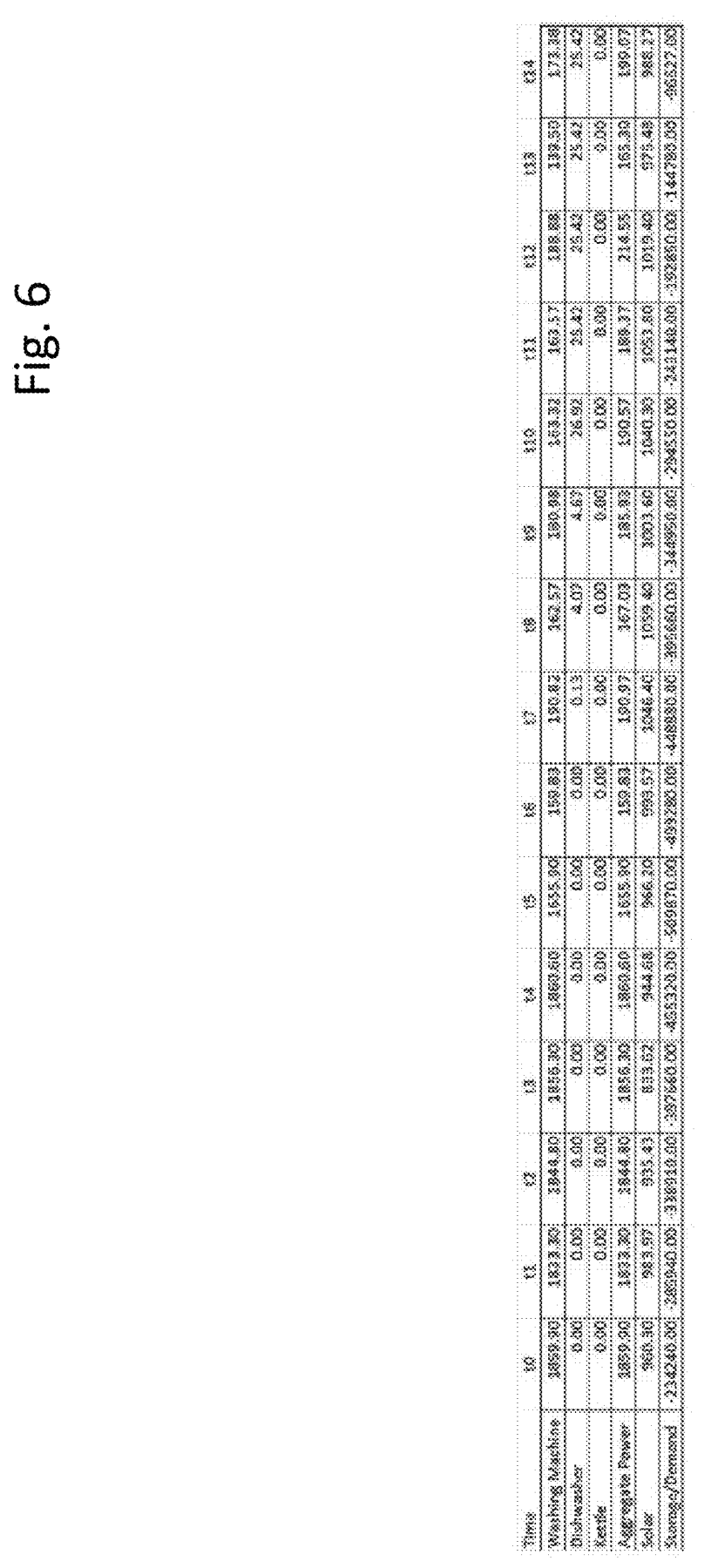

As each event is identified in S12, information relating to the projected utility consumption of the appliance corresponding to the identified event for an upcoming time period is obtained. For example, the next identified event may be a "kettle switch on" event. The power values corresponding to the kettle profile are obtained from the stored data, and a row in the database corresponding to the kettle is updated with the power values, starting from the current time bin as described above. FIG. 6 shows example database entries. The first row corresponds to the "washing machine". Each time bin is populated with power values from the washing machine stored profile. The next row is dishwasher and the next row kettle. In time period t7, the dishwasher has switched on and the remaining time bins are populated with power values from the dishwasher stored profile. The time bins 0 to 6 are populated with zeroes. No event corresponding to the kettle has been detected, and therefore the kettle row is populated with zeroes. In this example, only three appliances are shown, however a premises may have a large number of appliances, each corresponding to a database row.

If a detected event is already accounted for, no action is needed (since the appliance profile is already entered in the bins and the appliance is behaving as expected). For example, if the row corresponding to the appliance is already populated for the time interval, then no action is taken. If there is a departure from the expected behaviour (outside the deviation parameters) then an update is performed.

In addition to the detected events, other information may be used to obtain information relating to the projected utility consumption of the appliances for upcoming time periods. For example, it may also be determined whether an appliance event is predicted to occur based on one or more of: historic usage patterns, cloud cover information, weather forecast information, time of day information, solar levels information, occupancy levels detected at a sensor, sound detected at a sensor, temperature detected at a sensor, wind levels detected at a sensor and humidity detected at a sensor for example. If an appliance event is predicted to occur based on this information, the information relating to the projected utility consumption of the appliance for an upcoming time period is obtained from stored information and the database entries for the appliance are updated in the same manner as described previously.

Thus events are detected as they occur, and utility consumption information relating to appliance utility consumption for a period of time after the detected events is retrieved from stored information. However, it is also determined which events are predicted to occur in advance, and this information is also used to determine the upcoming utility consumption. This may be based on historic usage patterns and time of day information for example. In this case, it is determined which appliance(s) the premises is using at what time to be able to identify patterns of usage. For example, if a kettle is determined to be switched on every morning around 6.30 am except on weekends, when it is switched on at 8 am, then it can be predicted that if tomorrow is a week day 2000 kW will be required for 90 seconds at 6.30 am.

Alternatively, the events may be predicted based on weather related information. For example, if the weather is currently bad (e.g. cold, wet and very humid) and it is anticipated or detected that the washing machine is used, then there is a high probability that the tumble dryer will be used soon after the washing machine cycle finishes.

These predictions may be determined using rule based ITTT methods ("If This Then That"). Rules can be created dynamically from various sources and can trigger various outputs.

Thus predicted events (as well as detected events) may be used to update the appliance utility consumption information.

In S14, a projected utility consumption of the premises is updated based on the obtained information.

The database may comprise a utility consumption database row. The utility consumption database row comprises information indicating the total utility consumption for each time bin. The total utility consumption amount for each time bin is updated by summing the values from all appliance consumption database entries for the time bin. For example, the fourth row in the database in FIG. 6 shows the aggregate power, and is the sum of the values for the washing machine, dishwasher and kettle for each time bin.

In S15, it is then determined whether any projected stored and/or generated utility amount at the premises is sufficient for the projected utility consumption of the premises.

The database also stores information relating to the amount of utility available from a micro-generation system. For example, the database may comprise a row comprising information relating to the generated utility amount.

A generated utility amount at the premises for an upcoming time period may be determined. A database entry corresponding to a generated utility amount for the time bin is updated with the amount. The generated utility amount may be predicted from information relating to one or more of: cloud cover forecast information, weather forecast information, time of day information, sun and solar panel azimuth and elevation information, wind forecast information, solar levels information, temperature information detected at a sensor, wind levels information detected at a sensor and humidity information detected at a sensor for example. For example, for a solar energy generation system, the amount of energy that will be generated for upcoming time periods may be predicted using weather forecasts and satellite imagery then determining the cloud height, opacity and movement over time and triangulating the position of the sun over time. The result is the number of lumens that will hit the solar panels over time. The azimuth and declination of the solar panel installation together with the specifications of the same solar panels are used to compute a linear function that will give a power value over time. This is a solar prediction model, which can be used to predict the generated power for upcoming time periods.

The actual generated amount for the current time bin may be measured through a current clamp and voltage sensor at the generation system for example. This may be used to update the value for the current time bin.

A stored utility amount at the premises for an upcoming time period may also be determined. A database entry corresponding to a stored utility amount for the time bin is updated with the amount. The current stored power may be determined via an API for example, and the current time bin updated with this value. The stored power for future time bins is predicted sequentially for each time bin, working forward from the current time bin. The stored amount for each time bin is determined as the stored amount for the previous time bin (the actual value for the current time bin is used for the first step) minus the consumed amount for the time bin, and plus the generated amount for the time bin.

For each time bin, it is determined whether any projected stored and/or generated utility amount at the premises is sufficient for the projected utility consumption of the premises in the time bin. In the above example, determining whether any projected stored and/or generated utility amount at the premises is sufficient for the projected utility consumption of the premises for a time bin may comprise determining whether the stored amount for the time bin is greater than or equal to zero (in which case the stored/generated amount is sufficient) or less than zero (in which case it is not sufficient).

The data for each time bin may be updated each time new data is received (for example a new event is detected or new information is received).

If sufficient, then the internal power (i.e. stored and/or generated) is used. If not sufficient, in S16 a request to receive a utility amount from one or more other premises connected to the premises is transmitted via a communication network. The request may be sent to the one or more other premises using secure peer-to-peer communication, such as a Blockchain framework. The request may be added as a block to the Blockchain. The request may comprise one or more of: utility price information, a utility amount, a time period, and the identity of the premises. For example, a request to receive, during a period of upcoming time corresponding to a time bin, a utility amount from the one or more other premises may be sent. Upon receipt of a block, the authenticity of the block may be confirmed.

When a request to receive a utility amount is received by a device in another premises, it is determined whether any projected stored and/or generated utility amount at the premises is sufficient to provide the utility amount to the premises.

Utility management devices may be located in various different premises. The utility management device in the premises performs the above described steps. There may be a separate utility storage facility comprising an aggregator utility management device connected to the utility management devices. The premises and utility storage facility are connected via a utility network. The utility management devices may be identified through their registration to a Blockchain.

In S16, utility management device sends the request to receive a utility amount through an API. The API formats a request, which may be encrypted and then added as a new block to the Blockchain. The change is then communicated to the other devices on the Blockchain.

The devices confirm the authenticity of the newly added block and determine whether they can fulfil the request. This determination may be based on projected stored and/or generated utility amounts and projected utility consumption of the premises, which may be generated for each utility management device as described above. If two premises agree on a contract it may be digitally signed. When a request to receive a utility amount is received by a device in another premises, and it is determined that a projected stored and/or generated utility amount at the premises is sufficient to provide the utility amount to the premises, the utility management device outputs an instruction to release a utility amount from a storage medium and/or generator at the premises to the utility storage facility via the utility network at the agreed upon time. The energy is released by the seller when required by the buyer. The aggregator doesn't store any power that hasn't been traded with it directly (i.e. unless they are the buyer). For example, an aggregator facility may be connected to the premises via a utility network. The aggregator facility may comprise a utility storage facility, for example a battery. When the utility management device outputs the instruction, a utility amount from a storage medium and/or generator at the premises is transferred to the utility storage facility. The utility storage facility then transfers the requested amount to the premises which requested to receive the utility.

If determined to be sufficient in S16, then in S17, it may be determined whether the stored utility amount and/or the generated utility amount provide an excess. If it does provide an excess, a request to provide a utility amount is made to the one or more other premises. For example, it may be determined whether the stored utility amount and/or the generated utility amount provide an excess for an upcoming time period. A request to provide a utility amount for an upcoming time is then sent if there is an excess.

Figure 5:
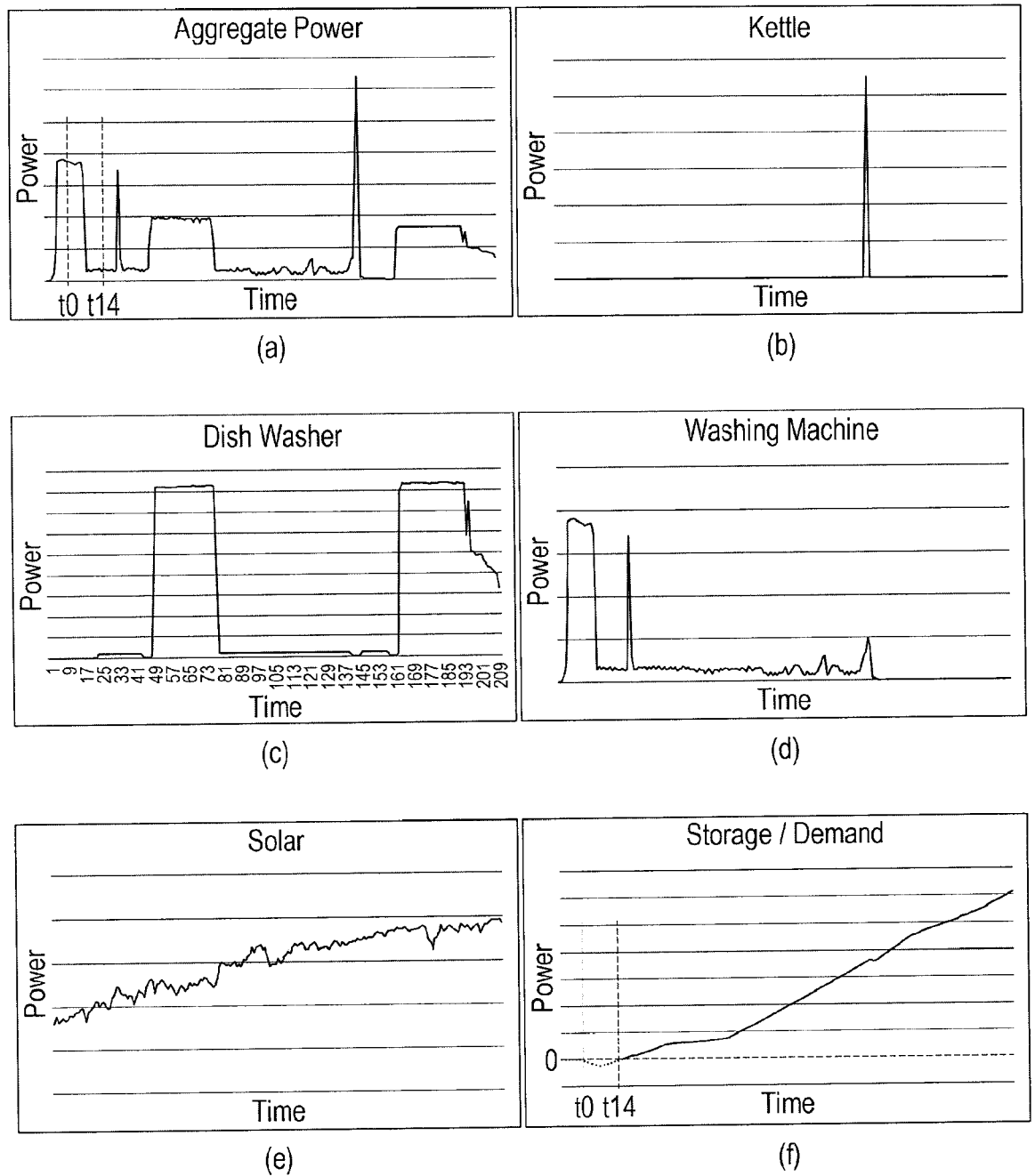
FIG. 5 shows example time normalised, predicted waveforms for different appliances, energy generation and storage/demand requirements.

FIG. 5 depicts data at various stages of the algorithm. When, by way of example only, a washing machine is switched on and the system detects this occurrence, a new row in a prediction table is created as depicted in FIG. 6 by row labelled "Washing Machine". The row in the table contains the expected second by second power consumption of the appliance and is sourced from the historic usage of the appliance, shown in graph (d). FIG. 6 has been condensed to 5 minute column average from the second by second prediction table for better visibility. The vertical dotted lines in FIG. 5 graph (a) and graph (f) define the limits of the data presented in FIG. 6 and are labelled accordingly.

The table also contains the predicted energy generation labelled "Solar" and the predicted energy storage labelled "Storage/Demand". A negative value in the table indicates that the premises does not have enough power to operate the appliances according to the prediction table and needs to acquire power from external sources as described below. Should another appliance switch on after an arbitrary amount of time, such as, by way of example only, a dishwasher at "t7" and the system detects this occurrence, a new row in the prediction table is created as depicted in FIG. 6 by row labelled "Dishwasher". The new row in the table contains the expected second by second power consumption of the appliance and is sourced from the historic usage of the appliance shown in graph (c).

Furthermore, the algorithm may infer that there is a high probability that a kettle might be switched on at a specific point in time in the near future. In such a case, an additional row is created in the table with the predicted power consumption of the kettle sourced from historic data (Kettle data is out of range of the table shown).

As the prediction table is built, it offers the algorithm a clear picture of the energy consumption of the premises resulting in an aggregation of power requirement over time as depicted by FIG. 5 graph (a) and row labelled "Aggregate Power" in FIG. 6. This information is combined with the predicted energy generation as described above and depicted in FIG. 5 graph (e). The resultant combination of data in the table in addition to the current energy storage level and capacity information shows the amount of energy surplus that the system can store or the amount of energy deficit that the premises will encounter. The latter is depicted in FIG. 5 graph (f) between point "t0" and "t14" where the energy requirements surpass the stored energy levels and therefore the premises needs to acquire additional power to operate the predicted appliances. The energy acquisition is further described below.

The Machine Learning algorithm 5 which can be by way of example, a Hidden Markov Layer algorithm (HMM) or a Deep Neural Network algorithm (DNN) or any other suitable learning algorithm that is able to perform classification, is trained using real data. The real data is collected through various means such as, by way of example only, Non-Intrusive Load Monitoring (NILM) devices installed at a premises which are connected to the premises mains input, the micro-energy-generation system and the energy storage system as described above.

Figure 3:
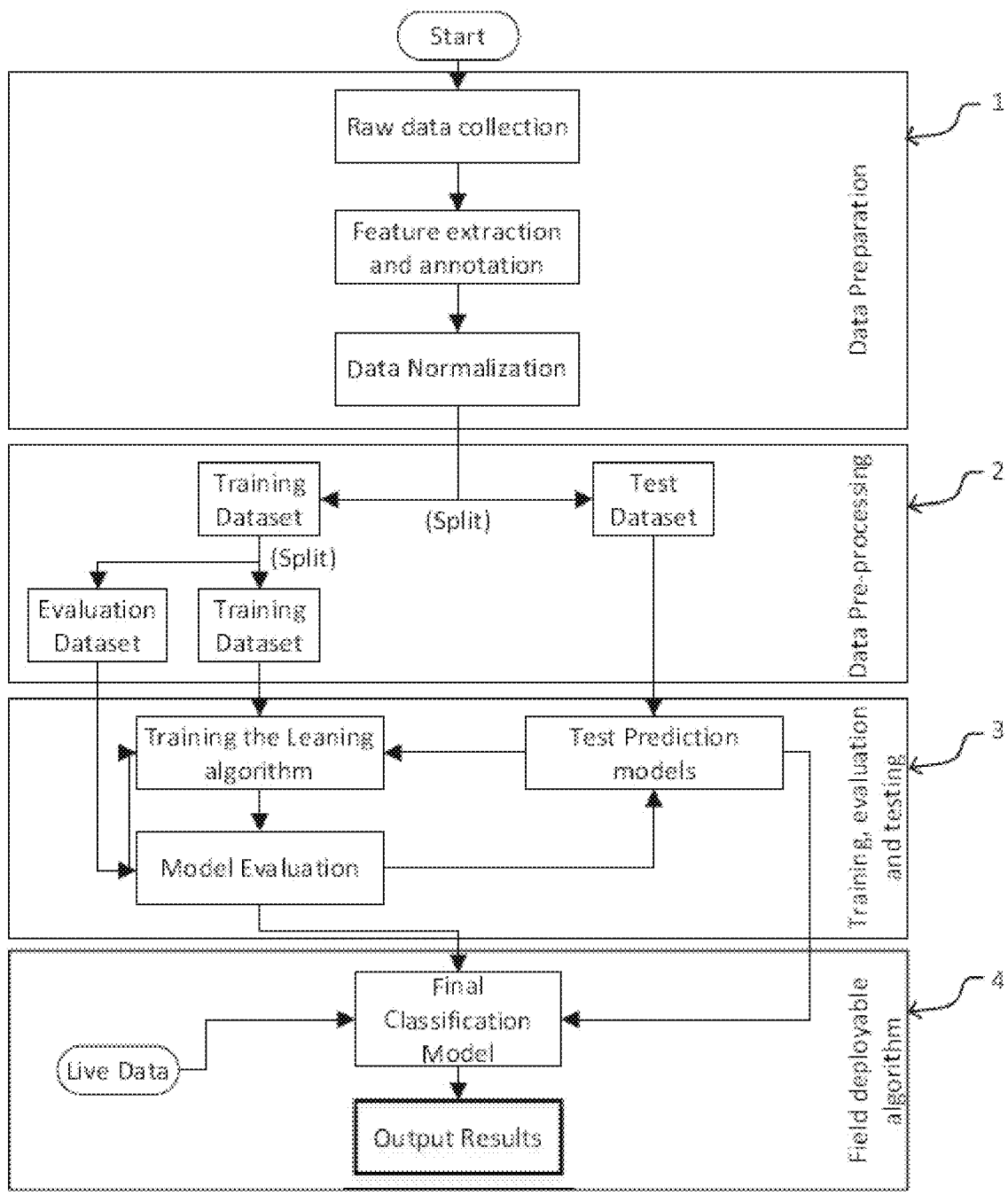
FIG. 3 shows a flowchart for a method of training a machine learning algorithm according to an embodiment.

FIG. 3 shows a flow chart of the training algorithm. The data from the NILM devices is collected, combined (see FIG. 4 and description below), analysed to extract relevant features, annotated and normalized in the Data Preparation stage 1. This stage may also involve transforming the data into the frequency domain so that the HMM or any other suitable algorithm is trained in both time and frequency domain.

The data is then split into a Training Dataset and a Test Dataset where the former is further split into the actual Training Dataset and an Evaluation Dataset in the pre-processing stage 2. The algorithm is then trained, evaluated and tested in stage 3 through a number of iterations until the algorithm fits the required models. The final classification algorithm is then presented with Live Data in a real world environment 4 to verify the results before being deployed into NILM devices. This leads to an appliance detector and classifier which is able to identify appliances when they switch on.

The training method uses a corpus of data comprising utility signals. The data may comprise labels which identify the appliance component state change corresponding to the events in the signals. A signal from the training corpus is inputted. The signal is monitored for a change in magnitude, in the same manner as described previously in relation to S12. If a change is detected, a component event corresponding to the change is identified using an algorithm, in the same manner as described previously in relation to S12. The output information from the algorithm may comprise a vector of probability values, each corresponding to a particular appliance component state change. The training information may comprise a ground truth vector, in which the probability value corresponding to the appliance component state change corresponding to the event is 1, and the probability value corresponding to all other appliance component state changes is 0.

The ground truth vector and output vector from the algorithm may be used to determine a loss. The loss is a measure of error between the computed outputs and the desired target outputs of the training data. The loss function may be a cross entropy error for example. The gradient of the loss with respect to each of the trainable parameters of the algorithm (e.g. the weights and biases of a neural network) can be determined through back-propagation, and used to update the parameters. The signals may be inputted in batches, and the update performed for each batch. This results in an array of gradient values, each corresponding to a parameter (i.e. weights, biases) for each signal in the batch. These are converted to a single gradient value for each parameter (for example by taking the average of the gradient values for the particular parameter).

The resulting gradient for each parameter is then used to calculate the updated parameter from the previous values using an optimizer function (e.g. a gradient descent type optimiser function). The input to the optimiser function for each parameter is the previous value, the corresponding gradient value and a learning rate parameter. In general, gradient descent based optimizers update the parameter in the direction of steepest descent of the loss function with respect to the parameter, scaled by a learning rate. The parameters are replaced with the new values and the process iterates with another batch of training examples.

Furthermore, the historical data stored on the device gives a clear indication of the amount of power that the appliance will need through its operational cycle.

Figure 4:
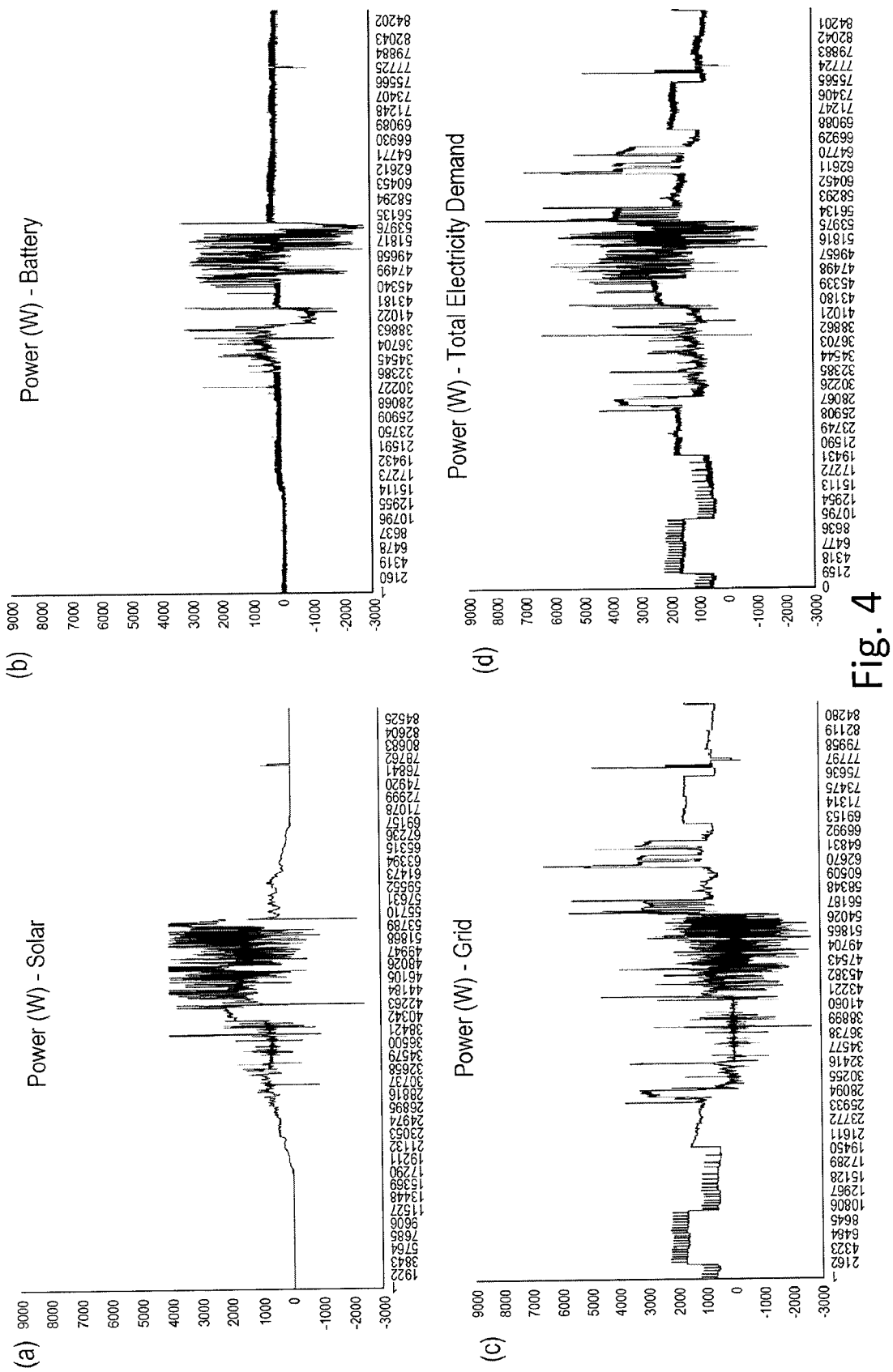
FIG. 4 shows power (Voltage and Current combined into real Power) data from a dwelling micro-energy-generation system in graph (a), the energy storage system in graph (b), the mains input in graph (c), and total energy demand of the dwelling irrelevant of the source in graph (d)

Referring now to FIG. 4, the overall power consumption of the premises is calculated using the real power output from the electricity generation method shown in graph (a), the electricity storage medium shown in graph (b) and the grid shown in graph (c) summed together in graph (d) to produce an output equivalent to the total energy consumption of the premises. This aggregate signal is monitored for events, as described above. The result is then filtered to remove very high frequency noise while any output (feed-in) to the grid i.e. any electricity supplied to the grid network outside the premises is clipped. This creates a clean output that is used by the classifier to identify and label the various devices on the electrical network with the premises.

Figure 8:
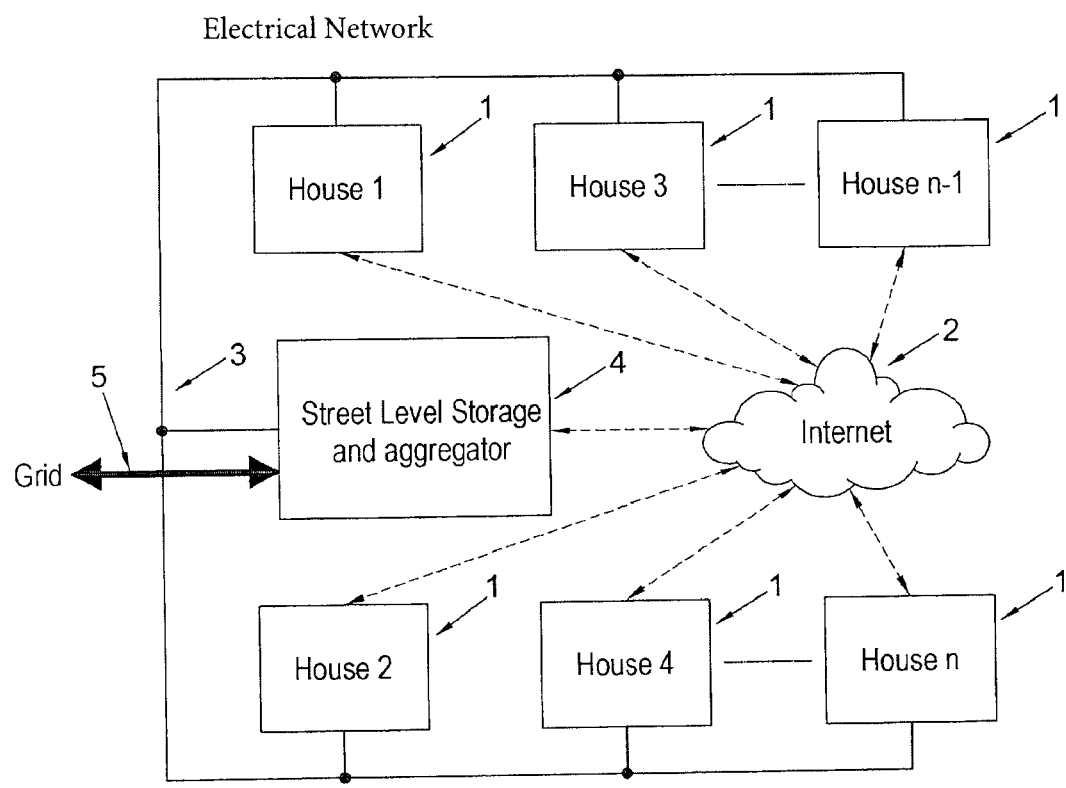
FIG. 8 shows street level connection and communication on a private/public blockchain, via an internet connection and electrical network.

Referring now to FIG. 8, once the algorithm within a premises 1 determines that there is a need to acquire energy from external sources, a negotiation process may be initiated with similar devices within the neighbourhood to pre-acquire energy before the need arises. The communication takes place over an internet connection 2 where the unit running the algorithm is connected to a local network over a wired or wireless medium. The local network is in turn connected to a router or other networking device that allows exchange of information and communication over the internet.

Units within the neighbourhood are identified, by way of example only, through their registration to a private Blockchain or by their relevant identification on a public Blockchain. Blockchain within this document refers to a distributed ledger with cryptographic integrity and may be a fully decentralised or a partially decentralised ledger of transaction, or any other exchange of information between the units hosting the algorithm and employing the use of a consensus method or any other secure peer-to-peer communications. The underlying Blockchain consensus method can be any available method, by way of example only, a Proof-of-Work, Proof-of-Stake, Proof-of-Activity, Proof-of-Burn, Proof-of-Capacity, Proof-of-Elapsed-Time, Proof-of-Delivery or a combination of any consensus algorithm available as described in various literature. The consensus is used to achieve agreement on a transaction data among the distributed nodes in the system. When a block of transactions is presented to the blockchain, a cryptographic hash is created. This hash needs to be validated by more than 50% of the nodes. Only then will it become a valid block in the chain.

Figure 7A:
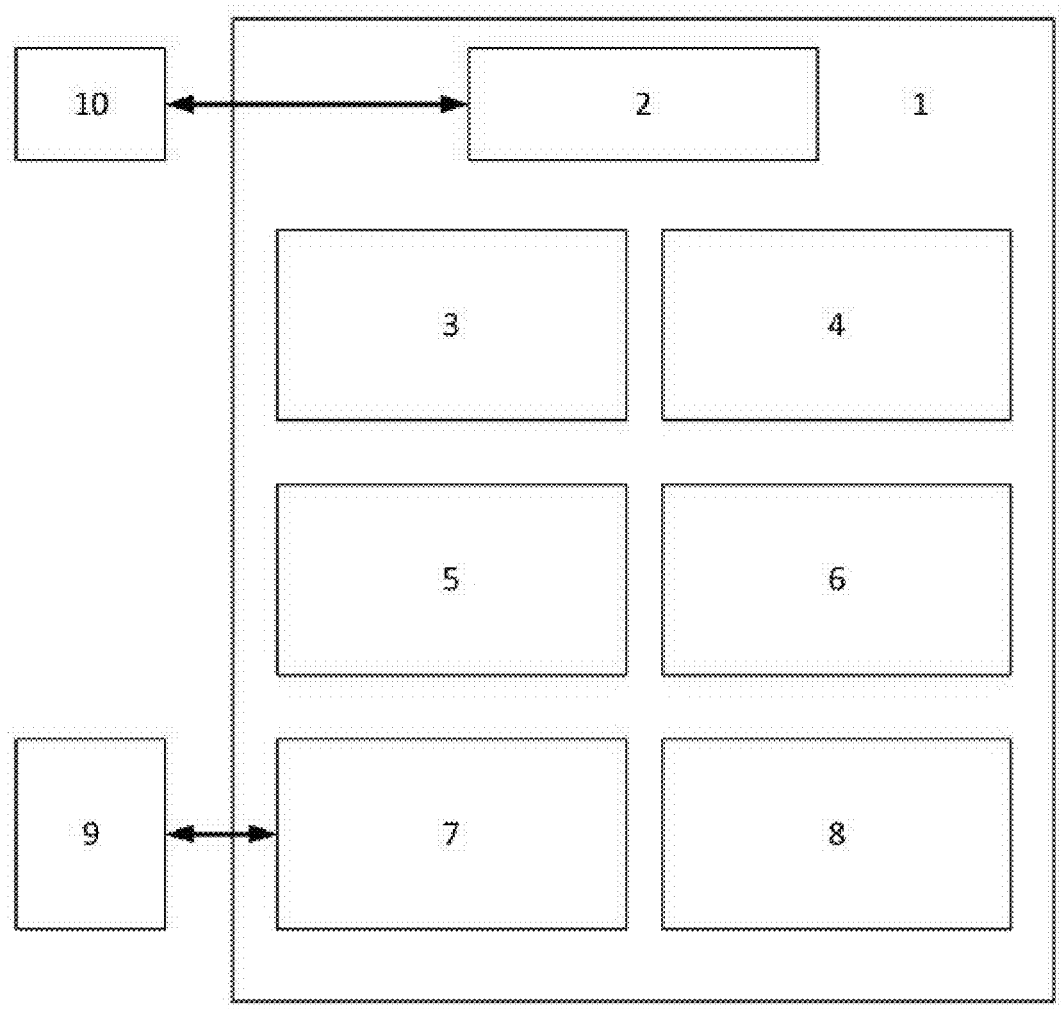
FIG. 7(a) shows a schematic illustration of a Blockchain framework.
Figure 7B:
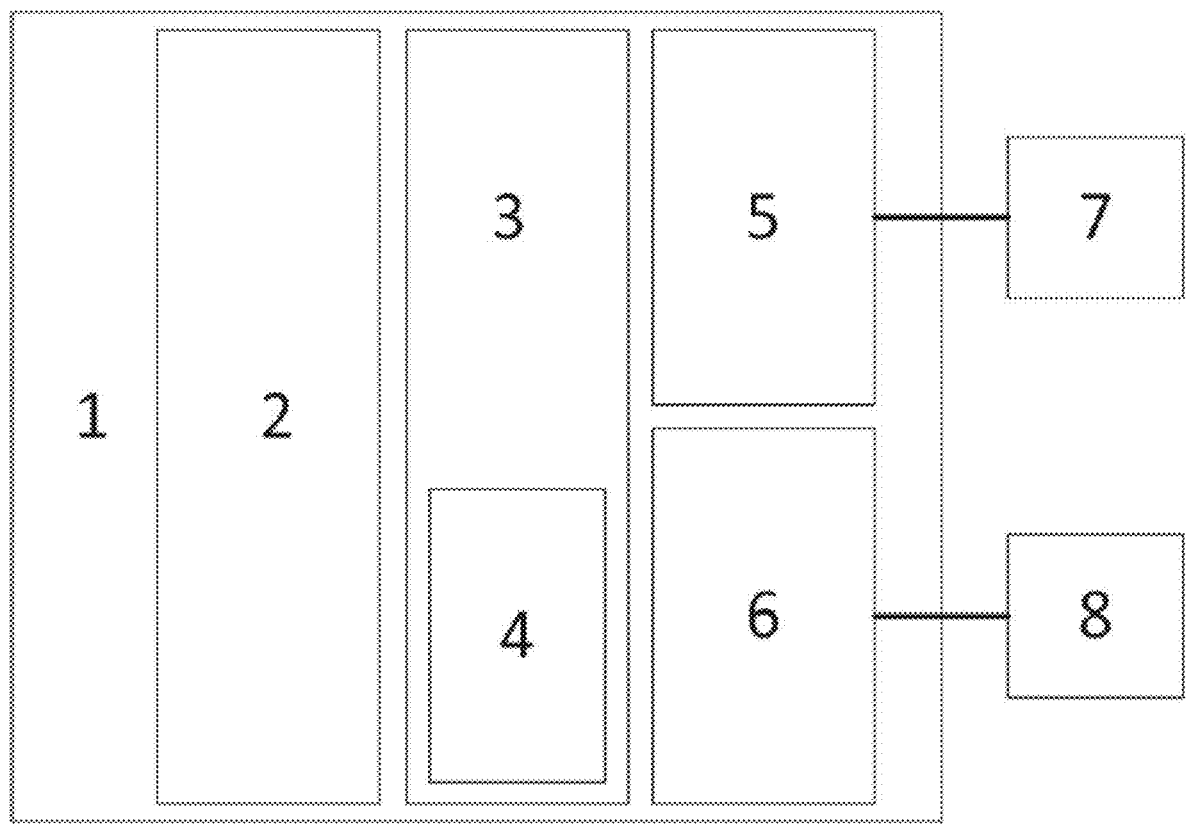
FIG. 7(b) shows a schematic illustration of a utility management system in accordance with an embodiment.

FIG. 7 shows a schematic illustration of the software running on a utility management device. FIG. 7 shows a schematic of the Blockchain algorithm 1 operating within the system 10, i.e. the utility management device. An Application Programming Interface (API) 2 is used to communicate with the rest of the algorithm, i.e. the forecasting and assessment of power consumption. The blockchain algorithm is the underlying framework that communicates/negotiates with other devices on the blockchain network. When a deficit of energy is detected and the algorithm requests power from neighbouring systems, a request is sent through the API. The API communicates with the "Smart Contract Block" 4 to create a request for energy. The request may contain, by way of example only, the amount of energy required, the time it is required, the identity of the premises, and/or the price offering for the desired amount of energy. The price may be, by way of example only, crypto-currency, blockchain tokens and/or real currency as described further below. The smart contract block 4 is an application running on every device connected to the blockchain network. The smart contract is part of the decentralized infrastructure and therefore, every device on the blockchain has a copy. Specific routines within the smart contract are called together with relevant variables depending on the task. These routines may contain instructions to update the ledger or other system wide communications. This information is propagated through all the nodes.

Using the 'Account Keys' 5 the smart contract is encrypted and presented to the "Blockchain Core" 8. The blockchain core 8 is an application running on every device connected to the blockchain network. The blockchain core adds the smart contract to the next block within the chain and hashes the block according to the rules set by the "Consensus Block" 6. The hashed block is added to the previous blocks which are in turn presented to the "Network Communications Block" of the algorithm 7 that communicates the changes to the other devices within the blockchain network. The hashes are the links in the chain. When a block is hashed, part of the data in the block is the hash of the previous block. Therefore any change in any of the blocks would result in a hash mismatch within the last block. Therefore, the nodes only need to verify the last block rather than every block in the system. Element 9 is the network communication module within the device.

The devices that receive these blocks confirm the authenticity of the newly added block using the consensus algorithm and public account keys stored in 5. The receiving devices are then able to read the smart contract and determine whether they can fulfil the energy demand based on their internal energy prediction tables, and optionally the price. If energy is available from numerous neighbouring premises then a bidding process may be initiated to determine the price. Each bid is added to the smart contract and the whole sequence is repeated until the buyer and one seller agree on the contract. The contract is digitally signed using the premises identity of both parties. Should the contract not be fulfilled by any party then the runner up bid is offered the contract until the energy requirement is fulfilled.

The price may be agreed using a pre-determined baseline price and maximum deviation parameters set by the owner of the premises to allow the algorithm to negotiate a spot price for the available energy. The deviation may be determined by means of a simple supply and demand algorithm that takes into account the energy cumulative of the entire street. Once a price and time is agreed between units, the energy is released at the stipulated time while supplier and consumer are credited and debited respectively according the agreed price. The currency of the transactions can be a real currency through bank accounts, a virtual currency and/or a crypto-currency such as, by way of example only, Bitcoin or Ethers and/or a credit account to which the parties have agreed to manage or a central aggregator manages on behalf of the parties at street level.

The aggregator also form part of the local private/public blockchain and is usually located, by way of example only, within the Street Level Storage facility 4. The Street Level Storage facility may contain an electricity storage medium by means of batteries or any other commercially available energy storage method in addition to a unit housing the said algorithm or supply power directly from the grid. The various types of premises are electrically connected to each other and the Street Level Storage facility by means of an appropriate electrical network 3 and may in turn be connected directly to the grid 5, completely isolated from the grid or a hybrid of both.

FIG. 7(*b*) is a schematic illustration of a utility management device in accordance with an embodiment. The device 1 comprises a processor 3 which takes an input signal or input data relating to a utility for a premises and outputs utility management information, for example a request to receive a utility amount from one or more other premises connected to the premises via a communication network. A computer program 4 is stored in non-volatile memory. The non-volatile memory is accessed by the processor and the stored code is retrieved and executed by the processor 3. The processor 3 may comprise logic circuitry that responds to and processes the instructions in the stored code. The storage 2 stores data that is used by the program 4.

The device 1 further comprises an input module 5 and an output module 6. The input module 5 is connected to an input 7 for receiving the data, for example from an external storage medium or a network. Alternatively, the input 7 may comprise hardware for sampling utility consumption, for example voltage and current consumption as described above.

Connected to the output module 6 is output 8. The output may be a transmitter for transmitting data to other utility management devices on the communication network. The utility management device 1 may also comprise a receiver for receiving data from other utility management devices on the communication network. A plurality of premises may each comprise such a device 1. For example, each premises shown in FIG. 8 (House 1, House 2, . . . ) may comprise such a utility management device. The utility management devices are connected via a communication network. The communication network is the medium over which the devices communicate in a decentralized manner using a blockchain framework.

In an embodiment, the components of the device 1 may be located in a common system with hardware for inputting and outputting data. Alternatively, the device 1 may be a remote device 1, which receives and transmits data. For example, the device 1 may be implemented using a cloud computing system, which receives and transmits data.

Although in the described system, a single processor 3 located in a device 1 is used, the system may comprise two or more remotely located processors configured to perform different parts of the processing and transmit data between them for example.

In use, the device 1 receives data through data input 7. The program 4, executed on processor 3, outputs utility management information.

Figure 9:
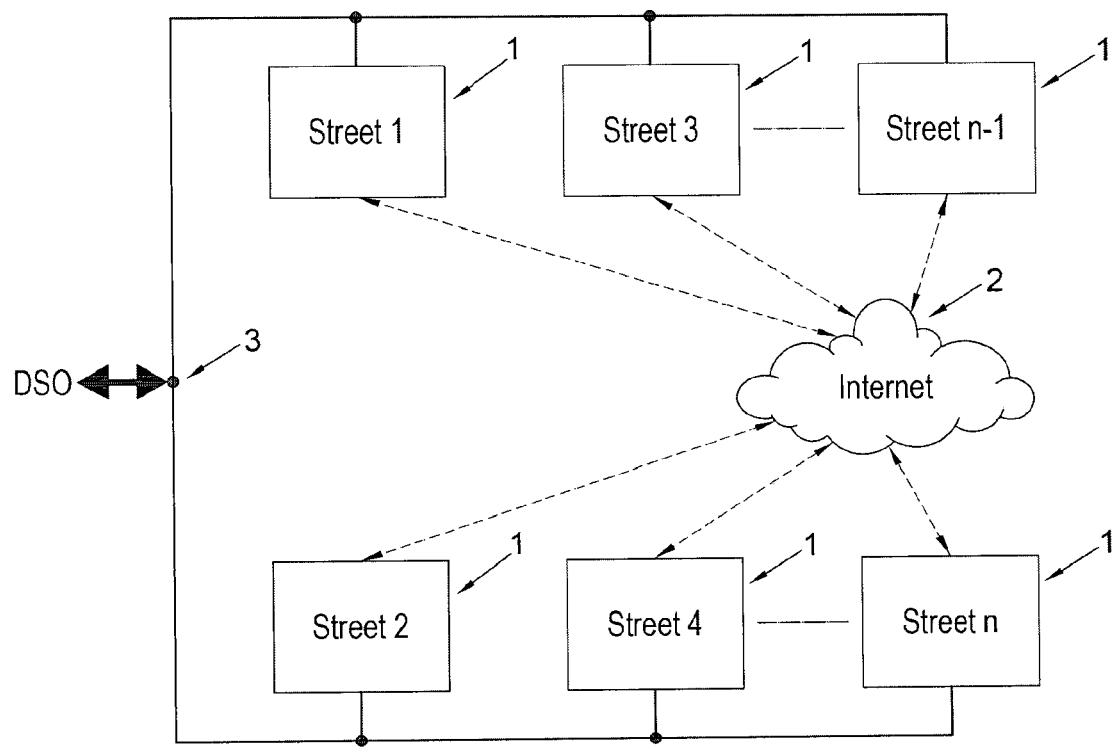
FIG. 9 shows Distribution System Operator (DSO) level connection and communication on private/public blockchain via an internet connection and electrical network.

Referring now to FIG. 9, each street level aggregator and/or storage system is connected to the grid as described above. The various streets 1 are connected together through an internet connection 2 and operate a private and/or public blockchain as described above or any other secure peer-to-peer communications. Therefore each street level system acts in a similar way to the premises level system in FIG. 8. The various streets are electrically connected through the Distribution System (or Network) Operator (DSO) 3. In such case the DSO acts as the aggregator where necessary. This hierarchy is repeated all the way up to the large energy generation suppliers such as power station or any other mass energy generation provider where private/public blockchain operated at every level whether the blockchain is isolated from the next hierarchy level or not.

A private blockchain allows for simpler governance structures that can be operated at lower cost compared to a public blockchain, whereas a public blockchain offers a more transparent means of operation and transaction maintenance. Both methods can be employed within the algorithm where a hybrid of methods can be used at any level within the hierarchy.

The method may be extended to other forms of utilities such as water and gas where the micro-generation might not be present or is replaced completely or partially by means of additional storage at various levels within the hierarchy.

In an embodiment, a methods for securely trading electricity from domestic or commercial micro-generation premises based on a blockchain platform with the ability to foresee and pre-trade the energy requirements or surplus of a premises is provided. In particular the method may monitor the electrical requirements of a premises including its electricity consumption, electricity generation and electricity storage to determine if any additional energy is required at specific times in the immediate or near future and may trade energy with neighbouring systems to ensure energy is available at the required time.

Furthermore, the method may also be able to release energy from the storage and energy generation methods within a premises to the grid and/or street level storage/aggregator and communicate with other such devices on the grid and within the neighbourhood to trade any surplus energy or demand energy from the neighbourhood. Since the energy demand of an appliance is well understood and the method may be able to detect when an appliance has switched on, the said invention is able to trade and/or pre-trade any energy demand or surplus before it is actually needed ensuring the best possible transaction rate for both supplier and consumer of the energy. The trading mechanism may be analogous to the high frequency currency trading know as "forex", where speed of trading and market foresight ensures the best trade deal. The trading negotiation, contract, and proof of supply and consumption may all be handled by an underlying blockchain framework or any other secure peer-to-peer communications. Similarly the present invention is able to operate within various levels of the energy distribution network or generation.

Further embodiments are set out in the following clauses:
1. A utility management device, comprising:
  input for receiving a utility consumption signal for a premises;
  an output for outputting utility management information; and
  a processor configured to:
    monitor the input utility consumption signal for a change in magnitude;
    if a change is detected:
      identify an appliance event corresponding to the change;
      obtain information relating to the projected utility consumption of the appliance for an upcoming time period;
      update a projected utility consumption of the premises based on the obtained information;
      determine whether any projected stored and/or generated utility amount at the premises is sufficient for the projected utility consumption of the premises;
      if not sufficient, cause the device to output a request to receive a utility amount from one or more other premises connected to the premises via a communication network.

2. The device according to clause 1, wherein the request is sent to the one or more other premises using secure peer-to-peer communication.

3. The device according to clause 2, wherein the request comprises utility price information.

4. The device according to clause 2 or 3, wherein the request comprises a utility amount, a time period, and the identity of the premises.

5. The device according to any of clauses 2 to 4, wherein the secure peer-to-peer communication is a Blockchain and wherein outputting the request comprises adding the request as a block to the Blockchain and sending the block to the one or more other premises via the communication network.

6. The device according to any preceding clause, wherein if the stored utility amount and/or the generated utility amount is determined to provide an excess, the processor is configure to cause the device to output a request to provide a utility amount to the one or more other premises.

7. The device according to clause 6, wherein in response to a received request to provide a utility amount to another premises, the processor is configured to: determine whether any projected stored and/or generated utility amount at the premises is sufficient to provide the utility amount to the other premises.

8. The device according to clause 7, wherein the request comprises utility price information, and wherein if any projected stored and/or generated utility amount at the premises is determined to be sufficient and if the utility price is accepted, the processor is configured to cause the device to output an instruction to release a utility amount from a storage medium and/or generator at the premises to a utility network connected to the premises.

9. The device according to any preceding clause, wherein the processor is further configured to:
determine whether the premises has excess utility storage capacity;
if a current utility unit price is below a threshold value, cause the device to output a request to receive a utility amount from the one or more other premises.

10. The device according to any preceding clause, wherein the request is outputted within 3 seconds of the detection of the change.

11. The device according to any preceding clause, wherein it is determined whether any projected stored and/or generated utility amount at the premises is sufficient for the projected utility consumption of the premises for time bins each corresponding to an upcoming period of time, and wherein if not sufficient for a particular time bin, a request to receive, during the period of upcoming time corresponding to the time bin, a utility amount from the one or more other premises is output.

12. The device according to clause 11, wherein the processor is further configured to:
update a database, the database comprising entries for each time bin, updating the database comprising:
obtaining information relating to a stored utility amount at the premises for an upcoming time period, and updating a stored utility amount database entry for one or more time bins corresponding to the upcoming time period based on the information and/or obtaining information relating to a generated utility amount at the premises for an upcoming time period, and updating a generated utility amount entry for one or more time bins corresponding to the upcoming time period based on the information; wherein updating a projected utility consumption of the premises comprises updating an appliance utility consumption amount database entry for one or more time bins corresponding to the upcoming time period, wherein the projected utility consumption of the premises for each time bin is the sum of any appliance consumption database entries for the time bin.

13. The device according to clause 12, wherein determining whether any projected stored and/or generated utility amount at the premises is sufficient for the projected utility consumption of the premises for a time bin comprises subtracting any stored and/or generated utility amounts for the time bin from the utility consumption for the premises for the time bin.

14. The device of any preceding clause, wherein an appliance event comprises a change of state of the appliance or a component of the appliance.

15. The device according to any preceding clause, wherein identifying an appliance event corresponding to the change comprises extracting one or more features from the input signal and applying a classifier to a feature vector comprising the one or more features, wherein the classifier is configured to determine a probability that the change corresponds to each of a set of appliance events and the appliance event is identified as that with the highest probability.

16. The device according to clause 15, wherein extracting the one or more features comprises:
extracting a first section of the input signal, the first section being a section of the signal from a location prior to the change to a location after the change;
extracting a pre-component event portion of the first section, the pre-component event portion being at least a part of the first section of the signal prior to the change;
extracting a post-component event portion of the first section, the post-component event portion being at least a part of the first section of the signal after the change;
transforming each of the pre-component event portion and the post-component event portion into the frequency domain;
subtracting the frequency domain pre-component event portion from the frequency domain post-component event portion to give a resultant frequency spectrum, wherein the feature vector further comprises information relating to the resultant frequency spectrum for each component event.

17. The device according to clause 16, wherein transforming into the frequency domain comprises using a fast Fourier transform.

18. The device according to clause 16 or 17, wherein the information relating to the resultant frequency spectrum comprises the amplitude value corresponding to a plurality of harmonic frequencies, wherein the harmonic frequencies are the positive integer multiples of the fundamental frequency of the input utility consumption signal.

19. The device according to clause 15, wherein extracting the one or more features comprises:
extracting a first section of the input signal, the first section being a section of the signal from a location prior to the change to a location after change;
extracting a pre-component event portion of the first section, the pre-component event portion being at least a part of the first section of the signal prior to the change;
extracting a post-component event portion of the first section, the post-component event portion being at least a part of the first section of the signal after the change;

subtracting the time domain pre-component event portion from the time domain post-component event portion to give a resultant time domain signal, wherein the feature vector further comprises information relating to the resultant time domain signal for each component event.

20. The device according to any of clauses 16 to 19, wherein the location prior to the change and the location after the change are a fixed duration before and after the change.

21. The device according to any of clauses 15 to 20, wherein the classifier is a machine learning classifier.

22. The device according to any preceding clause, wherein monitoring the input appliance operation signal for a change in magnitude comprises monitoring for a change in magnitude greater than a threshold value.

23. The device according to any preceding clause, wherein the appliance operation signal is a continuously sampled time domain signal, wherein the sampling frequency is at least 50 Hz or at least 60 Hz.

24. The device according to any preceding clause, wherein obtaining information relating to the projected utility consumption of the appliance for an upcoming time period comprises retrieving the information from stored information, the stored information comprising information relating to the projected utility consumption of an appliance for a period after an appliance event occurs, for a plurality of appliance events.

25. The device according to clause 24, wherein the stored information comprises information relating to the projected utility consumption of an appliance for a period after an appliance event occurs, for a plurality of appliance events for a single appliance category type.

26. The device according to any preceding clause, wherein the utility consumption signal comprises an electrical power consumption signal.

27. The device according to clause 26, wherein information relating to a projected generated electrical power amount at the premises comprises the projected amount of electrical power available from any micro-generation devices at the premises.

28. The device according to clause 27, wherein the micro-generation devices comprise solar panels and/or wind turbines at the premises.

29. The device according to clause 27 or 28, wherein information relating to a projected generated electrical power amount at the premises is determined from information relating to one or more of: cloud cover, weather forecast, time of day, cloud cover forecast, sun and solar panel azimuth, elevation and wind forecast, solar levels, occupancy levels detected at a sensor, sound detected at a sensor, temperature detected at a sensor, wind levels detected at a sensor and humidity detected at a sensor.

30. The device according to any of clauses 26 to 29, wherein information relating to a stored electrical power amount at the premises during the period of time comprises the amount of electrical power stored at any energy storage medium at the premises.

31. The device according to any preceding clause, wherein the device is an electrical power disaggregation device configured to connect to the mains electricity supply of the premises.

32. The device according to any of clauses 1 to 25, wherein the utility consumption signal comprises a water consumption signal.

33. The device according to any of clauses 1 to 25, wherein the utility consumption signal comprises a gas consumption signal.

34. The device according to any preceding clause, wherein the utility consumption signal comprises the sum of the utility consumption from a utility grid, from utility storage at the premises and from utility generation at the premises.

35. The device according to any preceding clause, wherein the input is a receiver configured to receive the utility operation signal over a wired or wireless connection.

36. The device according to any preceding clause, wherein the processor is further configured to:
  determine whether an appliance event is predicted to occur based on previously detected appliance events;
  if an appliance event is predicted to occur;
    obtain information relating to the projected utility consumption of the appliance for an upcoming time period;
    update a projected utility consumption of the premises based on the obtained information.

37. The device according to clause 36, wherein determining whether an appliance event is predicted to occur is also based on one or more of: cloud cover, weather forecast, time of day, solar levels, occupancy levels detected at a sensor, sound detected at a sensor, temperature detected at a sensor, wind levels detected at a sensor and humidity detected at a sensor.

38. A system comprising a plurality of utility management devices according to any preceding clause, located in different premises, and a utility storage facility comprising an aggregator utility management device, the utility management devices and aggregator utility management device being connected via the communication network and the premises and utility storage facility being connected via a utility network.

39. The system according to clause 38, wherein the processor is further configured to cause the utility management device to output an instruction to release a utility amount from a storage medium and/or generator at the premises to the utility storage facility via the utility network.

40. The system according to clause 38 or clause 39, wherein outputting a request comprises adding the request as a block to a stored Blockchain and sending the block to the one or more other premises via the communication network;
  wherein upon receipt of a block, the processor in the utility management device is further configured to confirm the authenticity of the block, and determine whether the premises can fulfil the request.

41. The system according to clause 40, wherein the utility management devices are identified through their registration to a Blockchain.

42. A utility management method, comprising:
  monitoring an input utility consumption signal for a change in magnitude;
  if a change is detected:
    identifying an appliance event corresponding to the change;
    obtaining information relating to the projected utility consumption of the appliance for an upcoming time period;
    updating a projected utility consumption of the premises based on the obtained information;
    determining whether any projected stored and/or generated utility amount at the premises is sufficient for the projected utility consumption of the premises;
    if not sufficient, outputting a request to receive a utility amount from one or more other premises connected to the premises via a communication network.

43. The method of clause 42, wherein outputting a request comprises adding the request as a block to a stored Blockchain and sending the block to the one or more other premises via the communication network; wherein upon receipt of a block, the processor in the utility management device is further configured to confirm the authenticity of the block, and determine whether the premises can fulfil the request.

44. A utility management device, comprising:
an input for receiving a signal comprising information relating to appliance events for a premises;
an output for outputting utility management information; and
a processor configured to:
if an appliance event is input, obtain information relating to the projected utility consumption of the appliance for an upcoming time period;
update a projected utility consumption of the premises based on the obtained information;
determine whether any projected stored and/or generated utility amount at the premises is sufficient for the projected utility consumption of the premises;
if not sufficient, output a request to receive a utility amount from one or more other premises connected to the premises via a communication network.

45. The device according to clause 44, wherein the information relating to appliance events for a premises comprises information from smart appliances located in the premises.

46. A utility management method, comprising:
receiving a signal comprising information relating appliance events for a premises;
if an appliance event is input, obtaining information relating to the projected utility consumption of the appliance for an upcoming time period;
updating a projected utility consumption of the premises based on the obtained information;
determining whether any projected stored and/or generated utility amount at the premises is sufficient for the projected utility consumption of the premises;
if not sufficient, outputting a request to receive a utility amount from the one or more other premises connected to the premises via a communication network.

47. A carrier medium comprising computer readable code configured to cause a computer to perform the method of clause 42, 43 or 46.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A utility management device, comprising:
an input for receiving a utility consumption signal for a premises;
an output for outputting utility management information; and
a processor configured to:
monitor the input utility consumption signal for a change in magnitude;
if a change is detected:
identify an appliance event corresponding to the change by extracting one or more features from the input consumption signal and applying a classifier to a feature vector comprising the one or more features, wherein the classifier is configured to determine a probability that the change corresponds to each of a set of appliance events and the appliance event is identified as that with the highest probability;
obtain information relating to the projected utility consumption of the appliance for an upcoming time period;
update a projected utility consumption of the premises based on the obtained information;
determine whether any projected stored and/or generated utility amount at the premises is sufficient for the projected utility consumption of the premises;
if not sufficient, cause the device to output a request to receive a utility amount from one or more other premises connected to the premises via a communication network.

2. The device according to claim 1, wherein the request is sent to the one or more other premises using secure peer-to-peer communication.

3. The device according to claim 2, wherein the secure peer-to-peer communication is a Blockchain and wherein outputting the request comprises adding the request as a block to the Blockchain and sending the block to the one or more other premises via the communication network.

4. The device according to claim 1, wherein if the stored utility amount and/or the generated utility amount is determined to provide an excess, the processor is configure to cause the device to output a request to provide a utility amount to the one or more other premises.

5. The device according to claim 4, wherein in response to a received request to provide a utility amount to another premises, the processor is configured to: determine whether any projected stored and/or generated utility amount at the premises is sufficient to provide the utility amount to the other premises.

6. The device according to claim 1, wherein obtaining information relating to the projected utility consumption of the appliance for an upcoming time period comprises retrieving the information from stored information, the stored information comprising information relating to the projected utility consumption of an appliance for a period after an appliance event occurs, for a plurality of appliance events.

7. The device according to claim 6, wherein the stored information comprises information relating to the projected utility consumption of an appliance for a period after an appliance event occurs, for a plurality of appliance events for a single appliance category type.

8. The device according to claim 1, wherein the utility consumption signal comprises an electrical power consumption signal, wherein information relating to a projected generated electrical power amount at the premises comprises the projected amount of electrical power available from any micro-generation devices at the premises.

9. The device according to claim 8, wherein the micro-generation devices comprise solar panels and/or wind turbines at the premises.

10. The device according to claim 8, wherein information relating to a projected generated electrical power amount at the premises is determined from information relating to one or more of: cloud cover, weather forecast, time of day, cloud cover forecast, sun and solar panel azimuth, elevation and wind forecast, solar levels, occupancy levels detected at a sensor, sound detected at a sensor, temperature detected at a sensor, wind levels detected at a sensor and humidity detected at a sensor.

11. The device according to claim 1, wherein the processor is further configured to:
 determine whether an appliance event is predicted to occur based on previously detected appliance events;
 if an appliance event is predicted to occur;
  obtain information relating to the projected utility consumption of the appliance for an upcoming time period;
  update a projected utility consumption of the premises based on the obtained information.

12. The device according to claim 11, wherein determining whether an appliance event is predicted to occur is also based on one or more of: cloud cover, weather forecast, time of day, solar levels, occupancy levels detected at a sensor, sound detected at a sensor, temperature detected at a sensor, wind levels detected at a sensor and humidity detected at a sensor.

13. A system comprising a plurality of utility management devices according to claim 1, located in different premises, and a utility storage facility comprising an aggregator utility management device, the utility management devices and aggregator utility management device being connected via the communication network and the premises and utility storage facility being connected via a utility network.

14. The system according to claim 13, wherein the processor is further configured to cause the utility management device to output an instruction to release a utility amount from a storage medium and/or generator at the premises to the utility storage facility via the utility network.

15. The system according to claim 13, wherein outputting a request comprises adding the request as a block to a stored Blockchain and sending the block to the one or more other premises via the communication network;
 wherein upon receipt of a block, the processor in the utility management device is further configured to confirm the authenticity of the block, and determine whether the premises can fulfil the request.

16. A utility management method, comprising:
 monitoring an input utility consumption signal for a change in magnitude;
 if a change is detected:
  identifying an appliance event corresponding to the change by extracting one or more features from the input consumption signal and applying a classifier to a feature vector comprising the one or more features, wherein the classifier is configured to determine a probability that the change corresponds to each of a set of appliance events and the appliance event is identified as that with the highest probability;
  obtaining information relating to the projected utility consumption of the appliance for an upcoming time period;
  updating a projected utility consumption of the premises based on the obtained information;
  determining whether any projected stored and/or generated utility amount at the premises is sufficient for the projected utility consumption of the premises;
  if not sufficient, outputting a request to receive a utility amount from one or more other premises connected to the premises via a communication network.

17. A non-transitory carrier medium comprising computer readable code configured to cause a computer to perform the method of claim 16.

* * * * *